US010874947B2

(12) United States Patent
Benedetto et al.

(10) Patent No.: US 10,874,947 B2
(45) Date of Patent: Dec. 29, 2020

(54) CONNECTING A PLAYER TO EXPERT HELP IN REAL-TIME DURING GAME PLAY OF A GAMING APPLICATION

(71) Applicant: Sony Interactive Entertainment LLC, San Mateo, CA (US)

(72) Inventors: Warren Benedetto, Foothill Ranch, CA (US); Landon Noss, San Mateo, CA (US); Andrew Herman, Lake Forest, CA (US); Tom Srisook, Mission Viejo, CA (US); Chad Rolinski, Rancho Santa Margarita, CA (US); Parsa Shirazi, Long Beach, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 15/973,246

(22) Filed: May 7, 2018

(65) Prior Publication Data
US 2019/0291010 A1 Sep. 26, 2019

Related U.S. Application Data

(60) Provisional application No. 62/647,541, filed on Mar. 23, 2018.

(51) Int. Cl.
*A63F 13/79* (2014.01)
*A63F 13/87* (2014.01)
(Continued)

(52) U.S. Cl.
CPC ............. *A63F 13/79* (2014.09); *A63F 13/30* (2014.09); *A63F 13/35* (2014.09); *A63F 13/85* (2014.09);
(Continued)

(58) Field of Classification Search
CPC .......... A63F 13/79; A63F 13/35; A63F 13/87; A63F 13/30; A63F 13/85; A63F 13/86;
(Continued)

(56) References Cited

U.S. PATENT DOCUMENTS

2008/0004117 A1   1/2008  Stamper et al.
2011/0149022 A1*  6/2011  Klebanov ................ H04N 5/85
                                                              348/42
(Continued)

FOREIGN PATENT DOCUMENTS

CN     CN1060759912 A   11/2016
WO    WO2017071371 A1    5/2017
WO    WO2017218305 A1  12/2017

OTHER PUBLICATIONS

Kellerer, Claudia_PCT Notification of Transmittal of the International Search Report and the Written Opinion of the International Searching Authority, or the Declaration_dated Apr. 12, 2019_14 pages.

*Primary Examiner* — Allen Chan
(74) *Attorney, Agent, or Firm* — Penilla IP, APC

(57) ABSTRACT

A method for gaming assistance. Information relating to game plays of player for a gaming application is received at a back-end server. A current game context of a first game play of a first player is determined from the information. Historical expert game contexts of expert game plays of experts that have played the gaming application are determined from the information. An assistance query related to the first game play is received. The current game context of the first player is compared to the historical expert game contexts to determine at least one expert having a corresponding historical expert game context that matches the first game context. A first expert is assigned to the first player for obtaining assistance. A communication session is generated between a device of the first expert and a device of the (Continued)

first player to enable the first expert to render assistance to the first player.

26 Claims, 15 Drawing Sheets

(51) Int. Cl.
*A63F 13/35* (2014.01)
*A63F 13/30* (2014.01)
*A63F 13/85* (2014.01)
*G06F 16/432* (2019.01)
*G06N 3/08* (2006.01)
*A63F 13/86* (2014.01)
*G10L 15/26* (2006.01)
*A63F 13/497* (2014.01)
*A63F 13/67* (2014.01)

(52) U.S. Cl.
CPC .............. *A63F 13/86* (2014.09); *A63F 13/87* (2014.09); *G06F 16/433* (2019.01); *G06N 3/08* (2013.01); *G10L 15/26* (2013.01); *A63F 13/497* (2014.09); *A63F 13/67* (2014.09); *A63F 2300/303* (2013.01)

(58) Field of Classification Search
CPC ... A63F 13/497; A63F 13/67; A63F 2300/303
USPC .......................................................... 463/42
See application file for complete search history.

(56) References Cited

U.S. PATENT DOCUMENTS

| | | | |
|---|---|---|---|
| 2012/0100916 A1* | 4/2012 | Zalewski | A63F 13/12 463/36 |
| 2013/0035164 A1 | 2/2013 | Osvald et al. | |
| 2014/0235326 A1* | 8/2014 | Paracha | A63F 13/795 463/25 |
| 2014/0357352 A1 | 12/2014 | Van Luchene | |
| 2015/0067745 A1 | 3/2015 | Fear | |

* cited by examiner

CONNECTING A PLAYER TO EXPERT HELP IN REAL-TIME DURING GAME PLAY OF A GAMING APPLICATION

CLAIM OF PRIORITY

The present application claims priority to and the benefit of the commonly owned, provisional patent application, U.S. Ser. No. 62/647,541, entitled "CONNECTING A PLAYER TO EXPERT HELP IN REAL-TIME DURING GAME PLAY OF A GAMING APPLICATION," with filing date of Mar. 23, 2018, which is herein incorporated by reference in its entirety.

TECHNICAL FIELD

The present disclosure is related to gaming applications. Among other things, this disclosure describes methods and systems for providing expert assistance in support of game play of a player playing a gaming application.

BACKGROUND OF THE DISCLOSURE

With higher processing power video games are becoming more complex and expansive. However with the increased complexity, users may find it increasingly difficult to navigate through and/or complete the video game. For example, video games may become more expansive and include millions and even trillions of available options available to users. As such, a user could not possibly even try each of those available options, or even understand which of those options are available. In other cases, a user may reach a point in a video game that is seemingly impossible to navigate through or solve. For users, this occurs quite frequently where the user increasingly becomes frustrated with a game due to its difficulty or an inability to advance through the game and eventually ends up quitting the video game. For instance, in the game play of a video game the user may be trying to pass through an obvious gateway to reach another part of the gaming world in order to advance the game play. To illustrate, a user may need to go through a waterfall acting as the gateway, and has seemingly exhausted all available options in trying to pass. However, even though a solution is available and simple if known (e.g., pick up stabilizing rock and run through the waterfall), for whatever reason the user is unable to find the correct path or sequence of operations to gain entry. After hours of futility, the user may end up quitting the game because the user can find no way to advance.

It is in this context that embodiments of the disclosure arise.

SUMMARY

Embodiments of the present disclosure relate to connecting a player playing a gaming application to an expert over a communication session to provide real-time assistance during game play of the player. Several inventive embodiments of the present disclosure are described below.

In one embodiment, a method for providing gaming assistance is disclosed. The method includes receiving over a network at a back-end server information related to a plurality of game plays of players for a gaming application. The method includes determining from the information a current game context of a first game play of a first player. The method includes determining from the information a plurality of historical expert game contexts of a plurality of expert game plays of experts that have played the gaming application. The expert game plays being generated from players classified as experts for the gaming application. The method includes receiving an assistance query related to the first game play. The method includes comparing the current game context of the first player to the plurality of historical expert game contexts to determine at least one expert having a corresponding historical expert game context that matches the first game context. The method includes assigning to the first player a first expert for obtaining assistance. The method includes generating a communication session between a device of the first expert and a device of the first player to enable the first expert to render assistance to the first player.

In another embodiment, a non-transitory computer-readable medium storing a computer program for providing gaming assistance is disclosed. The computer-readable medium includes program instructions for receiving over a network at a back-end server information related to a plurality of game plays of players for a gaming application. The computer-readable medium includes program instructions for determining from the information a current game context of a first game play of a first player. The computer-readable medium includes program instructions for determining from the information a plurality of historical expert game contexts of a plurality of expert game plays of experts that have played the gaming application, the expert game plays generated from players classified as experts for the gaming application. The computer-readable medium includes program instructions for receiving an assistance query related to the first game play. The computer-readable medium includes program instructions for comparing the current game context of the first player to the plurality of historical expert game contexts to determine at least one expert having a corresponding historical expert game context that matches the first game context. The computer-readable medium includes program instructions for assigning to the first player a first expert for obtaining assistance. The computer-readable medium includes program instructions for generating a communication session between a device of the first expert and a device of the first player to enable the first expert to render assistance to the first player.

In still another embodiment, a computer system is disclosed having a processor and memory coupled to the processor, the memory having stored therein instructions that, if executed by the computer system, cause the computer system to execute a method for providing gaming assistance. The method includes receiving over a network at a back-end server information related to a plurality of game plays of players for a gaming application. The method includes determining from the information a current game context of a first game play of a first player. The method includes determining from the information a plurality of historical expert game contexts of a plurality of expert game plays of experts that have played the gaming application. The expert game plays being generated from players classified as experts for the gaming application. The method includes receiving an assistance query related to the first game play. The method includes comparing the current game context of the first player to the plurality of historical expert game contexts to determine at least one expert having a corresponding historical expert game context that matches the first game context. The method includes assigning to the first player a first expert for obtaining assistance. The method includes generating a communication session between a device of the first expert and a device of the first player to enable the first expert to render assistance to the first player.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
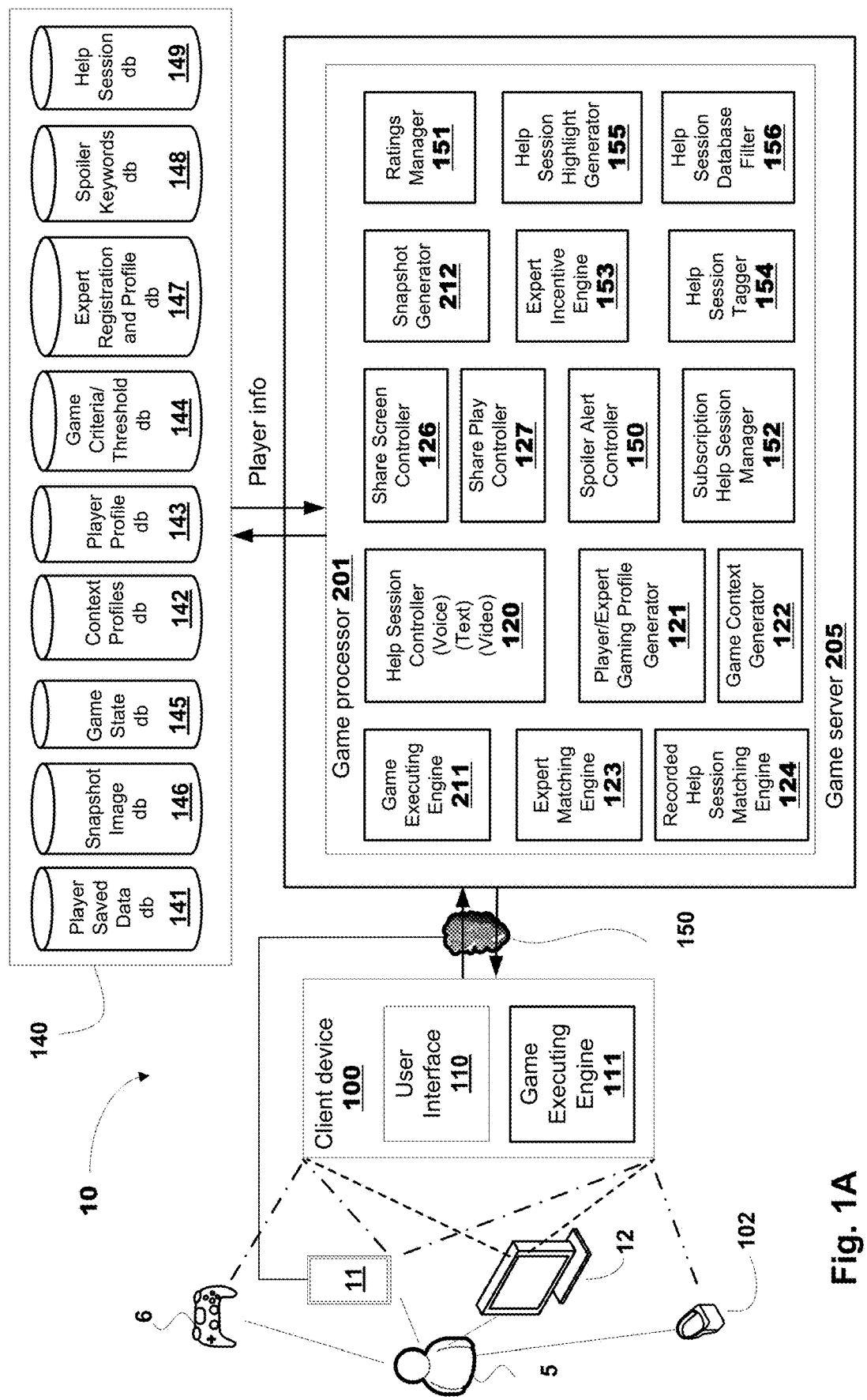
FIG. 1A illustrates a system used for providing real-time assistance during game play of a player playing a gaming application by connecting the player to an expert over a communication session, wherein the gaming application can be executing on a local computing device or over a cloud game network, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing real-time assistance during game play of a player playing a gaming application by connecting the player to an expert over a communication session. For example, when a player gets stuck on a part of a gaming application, the player can request help, such as via a gaming console or mobile application (e.g., executed on a mobile device) through a user interface. The player is then connected to a more experienced player (e.g., the expert) over a communication session, wherein the expert provides gaming assistance (e.g., the expert can help the player get unstuck). Experts can mark themselves "available" at any time, for any game they have played. An expert is generally a player who has registered and/or qualified as an expert. When a player requests help for that game, the request is sent to the available experts who are most likely to be able to help. The expert is matched to the player and can be connected via a live help session, or via a prior recording of a help session. The expert is selected based on their ability that relates to the context of the game that the player is having difficulty with. In one implementation, the first expert to accept the help request starts a help session with the player, wherein the matching of a live expert to the player is like a ride hailing Uber® model that is configured for providing live help sessions. In order to connect the player to an expert who can help, critical data about the player's current session is captured, such as quest, level, loadout, location, skills, etc. The player is then paired with an expert who ideally has already beaten that part of the game (e.g., which the player is currently playing and needs assistance), and ideally who did it with a similar configuration. During the help session, the expert can provide guidance via text, voice, video, and/or embedded video from a web, mobile, or console interface. In another implementation, the player is connected to an expert via a recorded help session. The recorded help session may provide the best assistance for the given query and/or game context, and as such instead of connecting the player to an expert via a live help session, the player is connected to an expert via a recorded help session. In one embodiment, the recorded help sessions for a given query and/or game context are ranked based on user/player feedback, and are selected based on the rankings.

With the above general understanding of the various embodiments, example details of the embodiments will now be described with reference to the various drawings.

Throughout the specification, the reference to "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

FIG. 1A illustrates a system 10 used for providing real-time assistance during game play of a player playing a gaming application by connecting the player to an expert over a communication session, in accordance with one embodiment of the present disclosure. For example, the assistance may be provided through a user interface configured to support the game play. The gaming application can be executing on a local computing device or over a cloud game network, in accordance with one embodiment of the present disclosure.

As shown in FIG. 1A, the gaming application may be executing locally at a client device 100 of the user 5, or may be executing at a back-end game executing engine 211 operating at a back-end game server 205 of a cloud game network or game cloud system. The game executing engine 211 may be operating within one of many game processors 201 of game server 205. In either case, the cloud game network is configured to provide real-time assistance to player by connecting the player to an expert over a communication session in a help session. The help session is conducted during the game play of the player playing the gaming application. The user interface 110 at client device 100 may support the help session, such that the player is able to request help through the user interface 110, and interact with (e.g., view, hear, present, etc.) the help in the help session provided in the user interface 110. Further, the gaming application may be executing in a single-player mode, or multi-player mode, wherein embodiments of the present invention provide for multi-player enhancements (e.g., assistance, communication, etc.) to both modes of operation.

In some embodiments, the cloud game network may include a plurality of virtual machines (VMs) running on a hypervisor of a host machine, with one or more virtual machines configured to execute a game processor module 201 utilizing the hardware resources available to the hypervisor of the host in support of single player or multi-player video games. In other embodiments, the cloud game network is configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment.

As shown, system 10 includes a game server 205 executing the game processor module 201 that provides access to a plurality of interactive gaming applications. Game server 205 may be any type of server computing device available in the cloud, and may be configured as one or more virtual machines executing on one or more hosts, as previously described. For example, game server 205 may manage a virtual machine supporting the game processor 201. Game server 205 is also configured to provide additional services and/or content to user 5. For example, game server is configurable to connect a player playing a gaming application to an expert over a communication session to provide real-time assistance, wherein the game server is configured to receive a request for assistance, match the player with an appropriate expert, and establish the help session that connect the player to the expert in real-time during the game play of the player, as will be further described below.

Client device 100 is configured for requesting access to a gaming application over a network 150, such as the internet, and for rendering instances of video games or gaming applications executed by the game server 205 and delivered to the display device 12 and/or head mounted display (HMD) 102 associated with a user 5. For example, user 5 may be interacting through client device 100 with an instance of a gaming application executing on game processor 201. Client device 100 may also include a game executing engine 111 configured for local execution of the gaming application, as previously described. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game. In embodiments, the HMD 102 can be configured to perform the functions of the client device 100.

Client device 100 is configured for receiving rendered images, and for displaying the rendered images on display 12 and/or HMD 102. For example, over a network 150 the rendered images may be delivered by an instance of a gaming application executing on game executing engine 211 of game server 205 in association with user 5. In another example, through local game processing, the rendered images may be delivered by the local game executing engine 111. In either case, client device 100 is configured to interact with the executing engine 211 or 111 in association with the game play of user 5, such as through input commands that are used to drive game play.

Further, client device 100 is configured to interact with the game server 205 to capture and store one or more game contexts of the game play of user 5 when playing a gaming application, wherein each game context includes information (e.g., game state, user information, etc.) related to the game play. More particularly, game processor 201 of game server 205 is configured to generate and/or receive game context of the game play of user 5 when playing the gaming application. In another implementation, game contexts may be generated by the local game execution engine 111 on client device 100, outputted and delivered over network 150 to game processor 201. In addition, game contexts may be generated by game executing engine 211 within the game processor 201 at the cloud network, such as through the game context generator 122. Game contexts may be locally stored on client device 100 and/or stored at the context profiles database 142 of the game server 205.

Each game context includes metadata and/or information related to the game play. Game contexts may be captured at various points in the progression of playing the gaming application, such as in the middle of a level. For illustration, game contexts may help determine where the player (e.g., character of the player) has been within the gaming application, where the player is in the gaming application, what the player has done, what assets and skills the player or the character has accumulated, what quests or tasks are presented to the player, and where the player will be going within the gaming application. Further, the metadata and information in each game context may provide and/or be analyzed to provide support related to the game play of the user, such as when matching a player requesting help during his or her game play to an expert, wherein the game play has a particular context related to the request for help, and the selected expert is best suited to providing help for that context. Specifically, based on the game contexts, client device 100 is configured to interact with game server 205 to display a user interface that is able to connect a player playing a gaming application to an expert through a communication session to provide real-time assistance during game play of the player.

More particularly, game context also includes game state data that defines the state of the game at that point. For example, game state data may include game characters, game objects, game object attributes, game attributes, game object state, graphic overlays, location of a character within a gaming world of the game play of the user 5, the scene or gaming environment of the game play, the level of the gaming application, the assets of the character (e.g., weapons, tools, bombs, etc.), the type or race of the character (e.g., wizard, soldier, etc.), the current quest and/or task presented to the player, loadout, skills set of the character, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. The game state data is stored in game state database 145.

Also, game context may include user and/or player information related to the player. Generally, user/player saved data includes information that personalizes the video game for the corresponding player. This includes information associated with the player's character, so that the video game is rendered with a character that may be unique to that player (e.g., shape, race, look, clothing, weaponry, etc.). In that manner, the user/player saved data enables generation of a character for the game play of a corresponding player, wherein the character has a state that corresponds to the point in the gaming application associated with the game context. For example, user/player saved data may include the skill or ability of the player, the overall readiness that the player seeks help, recency of playing the gaming application by the player, game difficulty selected by the user 5 when playing the game, game level, character attributes, character location, number of lives left, the total possible number of lives available, armor, trophy, time counter values, and other asset information, etc. User/player saved data may also include user profile data that identifies player 5, for example. User/player saved data is stored in database 141.

In one implementation, the game context is related to snapshot information that provides information enabling execution of an instance of the video game beginning from a point in the video game associated with a corresponding snapshot. Access to a particular snapshot that is captured during game play of a player, and that is stored allows another instance of the gaming application to be executed using information in the snapshot, such as game state and possibly user information relating to the previously described game context. For example, another user is able to jump into a parallel version of the game play associated with the snapshot. A full discussion on the creation and use of snapshots is provided within U.S. application Ser. No. 15/411,421, entitled "Method And System For Saving A Snapshot of Game Play And Used To Begin Later Execution Of The Game Play By Any User As Executed On A Game Cloud System," which is incorporated by reference in its entirety.

In one embodiment, the snapshot includes a snapshot image of the scene that is rendered at that point. The snapshot image is stored in snapshot image database 146. The snapshot image may be presented in the form of a thumbnail with respect to a timeline, wherein the snapshots provide various views into the game play of a user at corresponding points in the progression by the user through a video game as indicated by the timeline. The timeline can be used to replay a certain portion (e.g., last 2 minutes) of the player's game play to provide situational awareness to the expert when providing assistance. The replay portion may be sped up. After the replay portion is shown, live game play is then shown to the expert.

In addition, a player profile that includes information related to the corresponding player may be generated and stored in profile database 143. Profile information may include name, age, residence, account information, user related information from game context (e.g., user saved data stored in database 141), etc. The player/expert gaming profile generator 121 is configured to create and manage the player profile.

Game processor 201 includes help session controller 120 to facilitate the establishing and managing of a help session that provides real-time assistance during game play of a player playing a gaming application, such as by connecting the player to an expert over a communication session. The help session controller 120 may control one or more components to establish and manage the help session, including for example the expert matching engine 123, pre-help session matching engine 124, share screen controller 126, share play controller, and others. For example, when a player requests help, such as through a query (e.g., "How do I beat Boss-A?" or "I need help—NOW!"), the help session controller 120 is configured to connect that player with an expert over a communication session supporting the help session so that the expert can provide assistance.

In particular, game processor 201 includes expert matching engine 123 that in cooperation with the help session controller 120 is configured for matching the player to the expert based on game contexts for the player and the selected expert. That is, in order to connect the player to an expert who can help, critical data about the player's current session is captured, such as quest, level, loadout, location, skills, etc., which can be defined as game criteria, which includes game contexts previously described. Specifically, the matching process focuses on game criteria and/or thresholds when selecting the expert. Game criteria can be game context information, including game state and user/player saved data previously described, particular standards set by the player (e.g., only wants the best experts—5 star expert), expert availability, etc. For example, the game criteria is used to pair the player with an expert who has similar experiences with the gaming application based on the game criteria (e.g., weighting particular pieces of information). Game criteria may include threshold information to filter the pool of experts to a manageable set. For example, the threshold may be a minimum quality standard (e.g., expert rating, valuation, etc.), or recency of playing the gaming application so that the expert can provide the freshest assistance that is not encumbered with lack of immediate recall. Ideally, based on the game criteria, the expert has already beaten that part of the game (e.g., which the player is currently playing and needs assistance), and ideally who did it with a similar configuration.

An expert is generally a player who has registered and/or qualified as an expert. In one implementation, any player can register as an expert after at least playing a portion of the corresponding gaming application. In another implementation, a player can only register as an expert after reaching a qualification standard. For example, the qualification may be given to a player that is an expert of other games, or when a player has played the subject gaming application with high skill, or when a player achieves a certain task or quest identified as being a qualification standard (e.g., qualification boss, intermediate boss, end boss, etc.). Other qualification methods are supported. The player/expert gaming profile generator 121 is configured to create and manage the expert profile. Expert registration and profile information may be stored in database 147.

In one embodiment, when a player requests help for that game, the request is sent to the available experts who are most likely to be able to help. That is, the pool of experts are filtered to determine a set of experts that have similar game contexts as the player. In one implementation, the first expert from the filtered set to accept the help request is selected as the expert providing assistance. In that case, a help session is established between the player and the selected expert. In another implementation, the selected expert is the one who has the highest match based on the game criteria including game context, thresholds, ratings, etc. During the help session, the expert can provide guidance via text or voice, from a web, mobile, or console interface.

In one embodiment, to better help the player, the expert can request to spectate the player's screen—such as through a Share Screen (or ShareScreen) functionality. The expert can then watch a stream of the player's game (e.g., video), providing guidance during the game play. The Share Screen functionality is managed through the share screen controller 126 in cooperation with the help session controller 120.

If the player is unable to complete a given objective (e.g., task, quest, etc) himself with or without expert assistance, the expert can ask the player to share his controller, such as in a Share Play or SharePlay configuration that is configured to transfer control of the gaming application to the expert, in one implementation. In another case, the player may actively request the expert to take over control of the game play. In either case, the expert can then control the player's game (e.g., the game play) remotely via SharePlay or any similar functionality. As such, the expert is able to complete the objective for the player. At any point, control can be passed back to the player. For instance, the player may have a master position (e.g., kill switch) that when activated by the player switches control back to the player. As an example, the player may decide that the expert is going beyond what is agreed upon (e.g., expert playing beyond the objective), or may decide that he or she would like another go at the objective. Also, at any point (during or afterwards) the expert can always pass control back to the player. The SharePlay functionality is managed through the share play controller 127 in cooperation with the help session controller 120.

Game processor 201 includes a ratings manager 151 that is configured to store ratings and/or rankings of experts. For example, at the end of a help session, the player can rate the quality of the expert's help along a variety of metrics (helpful, friendly, knowledgeable, etc.). These ratings can be fed back into the system, for purposes of connecting players to the highest-quality help available, as per the ratings. For example, the ratings may be specific to a particular gaming application. In one implementation, experts that are rated with the highest quality (e.g., "5-star help") is only made available to players who have a subscription to a gaming service, such as SONY PlayStation Plus membership that provides access to digital games (free or by fee), cloud storage, discounts, online multi-player gaming, etc. Subscription access to qualified experts and management of membership and benefits are managed by the subscription help session manager 152.

As another feature of the help session manager 152, highly-rated experts may be eligible to have their own "professional help" video channels through the help service. In that manner, those highly-rated experts can monetize their help (e.g., through subscription or fee services) during a help session.

Further, each help session may be recorded, and stored in the help session database 149. For example, the help session controller is configured for recording and storing a corresponding help session. As such, instead of connecting a player to an expert for a live help session, the player may be connected with a recorded help session that is directed to the specific query presented by the player. In some cases, the recorded help session has a higher rating over any available live help session. For example, when players in the future seek help for a previously encountered and similar situation, recorded help sessions providing assistance for those situations can be returned. This will make help available even when live experts aren't available. Also, recorded help sessions that provide the best assistance may be preferred over live help sessions, as described below.

Figure 7:
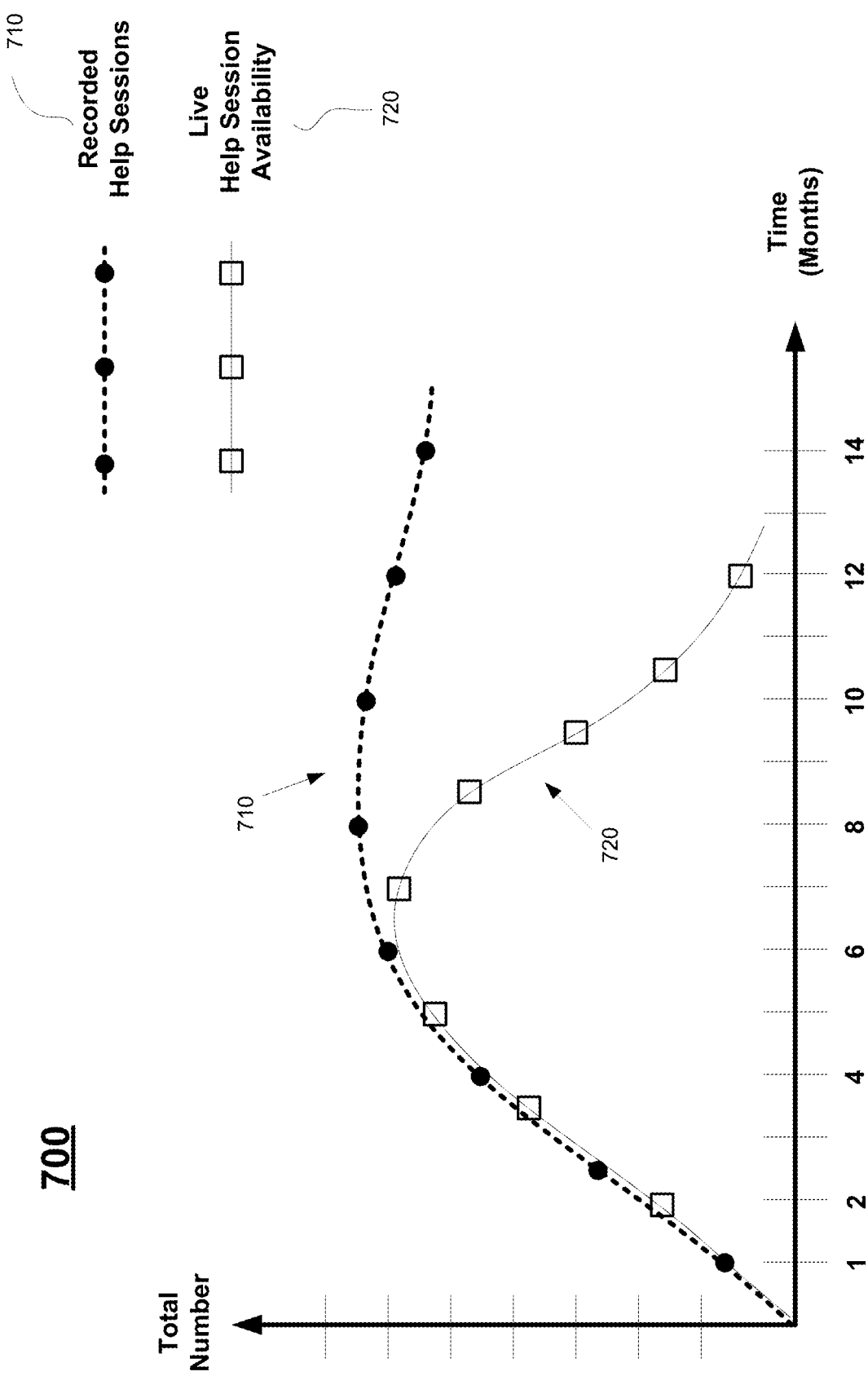
FIG. 7 is a graph illustrating the volume of availability of experts throughout the life of the gaming application, wherein the experts provide real-time assistance to a player playing the gaming application in real-time, and wherein the graph also shows the availability of recorded help sessions where experts provide assistance to players playing the gaming application, in accordance with one embodiment of the present disclosure.

FIG. 7 illustrates a graph 700 showing the availability of live help sessions and the availability of recorded help sessions throughout the life of the gaming application, in accordance with one embodiment of the present disclosure. In particular, the y-axis shows unit volume, such as the number of experts or recorded session available at any point in time during the life of a gaming application. For instance, the x-axis shows a time period, such as from a release of a gaming application out to beyond 14 months from the release date. Line 720 shows the availability of live help sessions as provided by experts. Line 710 shows the availability of recorded help sessions, wherein recorded help sessions provide assistance for the particular gaming application that is of interest to the player's query or request for help. As shown, during the early life (0-7 months) of a gaming application, live help sessions are readily available, as the gaming application is relatively new and interest in the gaming application is high amongst gamers. However, after 7 months, interest in the gaming application steadily wanes, as players and/or experts move on to play other gaming applications. On the other hand, recorded help sessions as shown by line 710 may plateau around the 7 month period. That is, lines 710 and 720 may closely track each other in the first 6 months showing that the availability of live help and recorded help is approximately equal. As live help diminishes, recorded help may be provided to players making requests for assistance.

Lines 710 and 720 in FIG. 7 show exemplary patterns of availability. For instance, the availability of recorded help sessions shown in line 710 may purposefully follow the availability of live help sessions shown in line 720 through the early life (e.g., 0-6 months) of a gaming application. In particular, the number of recorded help sessions shown in line 710 may be controlled by the help session database filter 156. Recorded help sessions may be periodically purged from database 149 based on various criteria. For example, as the number of help sessions grow, better quality help sessions may be recorded based on ratings. As such, the lesser quality help sessions may be purged. In addition, after a period of time, the filter 156 may retain only a specific number of help sessions. For example, for a particular query, filter 156 may decide to store only one or two recorded help sessions directed to that query. Other help sessions directed to that query may be purged. In that manner, the database 149 of recorded help sessions may be managed to store a limited amount of help sessions that are of high quality (e.g., in terms of providing assistance). This may result in a decline in the number of recorded help sessions over time, as shown beyond ten months in FIG. 7. In addition, because the number of recorded help sessions is managed, searching of the database 149 is more efficient. For example, searches conducted by the recorded help session matching engine 124 match a query or request for help to a recorded help session before a live help session is matched or presented. In some cases, a recorded help session provides the highest quality assistance for a particular query, and a live help session is unnecessary. In that case, connection to the recorded help is more efficient.

These recorded help sessions may be tagged using the help session tagger 154 with information related to a specific query. In that manner, a recorded help session may be tagged so that a match between a corresponding query and the help session can be determined. For example, when a query is presented by a player, a recorded help session that may provide direct assistance for that query may be found by searching for an appropriate tag (e.g., identifying a related query) in the help session database 149.

Game processor 201 includes an expert incentive engine 153 that is configured to attract players to register as experts. Experts may need some incentive to participate in help sessions. Incentives may be different than qualifications previously described. A qualification standard may be set so that only qualified players may register as experts. However, once a player qualifies, there is no guarantee that the player will register. An incentive may provide encouragement to a player to register as an expert. For instance, rewards may be given to registered experts. These rewards may come in various forms. In one case, the reward may be the release of a particular part of the gaming application made only available to experts. The release may be an object, or region of the game, or specific task, or specific quest that are made available only to registered experts. For instance, the release may come in the form of downloadable content (DLC). In addition, the reward may come in the form of a trophy or expert points, both of which may be used as a comparison to other experts. For example, a competition may exist between two friends to see who has more expert points, or more trophies.

Game processor 201 includes a spoiler alert controller 150. During a live help session, there is a danger that the expert may reveal too much when providing assistance. That is, the expert may reveal information that spoils a game for the player. Typically, the player is unaware of the pertinent information qualifying as spoiling information. Examples of spoiling may include a name of a boss that occurs at the end of the level, but the player is only midway through the level; an object that is the ultimate goal of the level or the entire gaming application; the name of a place in the gaming environment; name of a quest; name of an object, or character that has not been encountered yet, etc. The spoiler alert controller 150 may manage a toggle feature that when "ON" notifies the expert that the player is sensitive to spoiling information, and when "OFF" notifies the expert that the player is less sensitive and probably does not mind if spoiling information is released. Spoiler alert controller 150 may be configured to automatically detect spoiling information, such as through key word identification. The key words may be stored in database 148. Upon identification of the key word, that information may be masked before presentation to the player (e.g., masking text, or muting the pertinent audio, etc.). A slight time delay may be introduced to allow for masking. In addition, the spoiler alert controller 150 may notify the player that the expert is about to reveal spoiling information, such as in the form of a spoiler alert. The player may then give additional instructions, such as providing authorization to reveal the information, or to deny the revealing of the information.

Game processor 201 includes a help session highlight generator 155 that is configured to generate a highlight reel of a recorded help session. Highlights may be identified through active motion of one or more objects (e.g., character) in the game play as presented in the recorded help session. Periods of inactivity may indicate that no significant assistance is being provided. Both the highlight reel and the full version of the recorded help session may be stored in database 149. When that recorded help session is selected in response to a query made by a player in the future, the highlight reel of the recorded help session may be first presented to the requesting player. If requested, the full version may also be presented. In one implementation, the full version is downloaded while the highlight reel is being played in anticipation of being requested. In that manner, the full version may immediately be played upon request. In another implementation, the full version is first presented with the option of presenting the highlight reel. For example, the full version may be preceded with a notification that the most pertinent section (e.g., where the assistance is given) begins at 2 minutes into the 7 minute help session. The requesting player may be presented with an option to play the highlight reel at that time.

In one embodiment, the help session may be delivered to a device 11 (e.g., tablet) for display and interaction, wherein device 11 may be separate from client device 100 that is configured to execute and/or support execution of the gaming application for user 5 interaction. For instance, a first communication channel may be established between the game server 205 and client device 100, and a separate, second communication channel may be established between game server 205 and device 11 to deliver the help session.

Figure 1B:
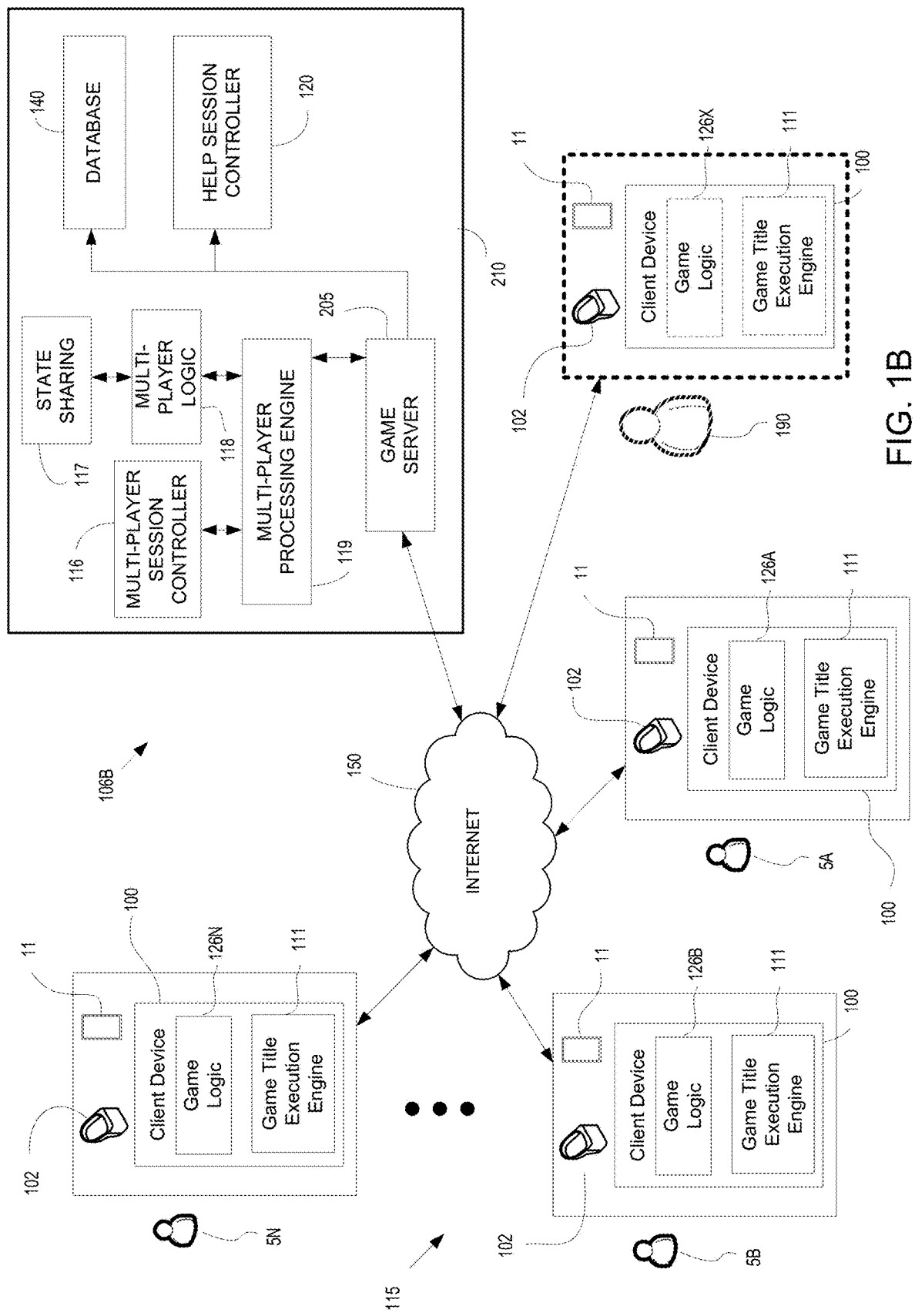
FIG. 1B illustrates a system providing real-time assistance during game play of a player playing a gaming application that is executing locally to the player by connecting the player to an expert over a communication session, in accordance with one embodiment of the present disclosure.

FIG. 1B illustrates a system 106B providing real-time assistance during game play of a player playing a gaming application through a help session, such as connecting the player to the expert over a communication session or by providing a recorded help session, wherein the gaming application is executing locally to the corresponding player, and wherein back-end server support (e.g., accessible through game server 205) may implement the establishing and managing of a help session. In one embodiment, system 106B works in conjunction with system 10 of FIG. 1A and system 200 of FIG. 2 to provide real-time assistance to a player through a live or recorded help session through the help session controller 120 at the game-cloud system 210, as previously described in FIG. 1A. Referring now to the drawings, like referenced numerals designate identical or corresponding parts.

As shown in FIG. 1B, a plurality of players 115 (e.g., player 5A, player 5B . . . player 5N) is playing a plurality of gaming applications, wherein each of the gaming applications is executed locally on a corresponding client device 100 (e.g., game console) of a corresponding user. At least one of the plurality of players 115 is an expert 190. The system 106B supports game play by the plurality of players 115 at one or more moments in time, such as over a period of time. In addition, each of the plurality of players 115 has access to a device 11, previously introduced, configured to receive information providing real-time assistance during game play of a player playing a gaming application through a help session, as previously described. Each of the client devices 100 may be configured similarly in that local execution of a corresponding gaming application is performed. For example, player 5A may be playing a first gaming application on a corresponding client device 100, wherein an instance of the first gaming application is executed by a corresponding game title execution engine 111. Game logic 126A (e.g., executable code) implementing the first gaming application is stored on the corresponding client device 100, and is used to execute the first gaming application. For purposes of illustration, game logic may be delivered to the corresponding client device 100 through a portable medium (e.g., flash drive, compact disk, etc.) or through a network (e.g., downloaded through the internet 150 from a gaming provider). In addition, player 5B is playing a second gaming application on a corresponding client device 100, wherein an instance of the second gaming application is executed by a corresponding game title execution engine 111. The second gaming application may be identical to the first gaming application executing for player 5A or a different gaming application. Game logic 126B (e.g., executable code) implementing the second gaming application is stored on the corresponding client device 100 as previously described, and is used to execute the second gaming application. Further, player 115N is playing an Nth gaming application on a corresponding client device 100, wherein an instance of the Nth gaming application is executed by a corresponding game title execution engine 111. The Nth gaming application may be identical to the first or second gaming application, or may be a completely different gaming application. Game logic 126N (e.g., executable code) implementing the third gaming application is stored on the corresponding client device 100 as previously described, and is used to execute the Nth gaming application.

In addition, expert 190 at some point may have been playing at least one gaming application in system 106B and has registered as an expert. For example, the expert may be playing a corresponding gaming application with cooperation of the client device 100 having game logic 126X and a game title execution engine 111, as previously described. In that manner, a player currently playing a gaming application in system 106B may request through the help session controller 120, as previously described, and be connected with the expert 190 that when selected may provide assistance for the game play of the requesting player. When providing assistance, expert 190 may need not be supported by client device 100, and may participate in the corresponding help session using any device, such as device 11 (e.g., smartphone) or HMD 102.

As previously described, client device 100 may receive input from various types of input devices, such as game controllers, tablet computers, keyboards, gestures captured by video cameras, mice touch pads, etc. Client device 100 can be any type of computing device having at least a memory and a processor module that is capable of connecting to the game server 205 over network 150. Also, client device 100 of a corresponding player is configured for generating rendered images executed by the game title execution engine 111 executing locally or remotely, and for displaying the rendered images on a display. For example, the rendered images may be associated with an instance of the first gaming application executing on client device 100 of player 5A. For example, a corresponding client device 100 is configured to interact with an instance of a corresponding gaming application as executed locally or remotely to implement a game play of a corresponding player, such as through input commands that are used to drive game play.

In one embodiment, client device 100 is operating in a single-player mode for a corresponding player that is playing a gaming application. Back-end server support via the game server 205 may provide assistance supporting game play of a corresponding player, such as connecting the player to a live or recorded help session with an expert providing assistance, as will be described below, in accordance with one embodiment of the present disclosure.

In another embodiment, multiple client devices 100 are operating in a multi-player mode for corresponding players that are each playing a specific gaming application. In that case, back-end server support via the game server may provide multi-player functionality, such as through the multi-player processing engine 119. In particular, multi-player processing engine 119 is configured for controlling a multi-player gaming session for a particular gaming application. For example, multi-player processing engine 130 communicates with the multi-player session controller 116, which is configured to establish and maintain communication sessions with each of the users and/or players participating in the multi-player gaming session. In that manner, players in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 140 of FIG. 1A and FIG. 2, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 115A when playing the game, game level, character attributes, character location, number of lives left, the total possible number of lives available, armor, trophy, time counter values, etc. User saved data may also include user profile data that identifies a corresponding user 115A, for example. User saved data may be stored in database 140.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

In addition, back-end server support via the game server 205 may provide support services including providing real-time assistance during game play of a player playing a gaming application through a help session. As previously introduced, the help session controller 120 is configured to establish and manage one or more help sessions that provide assistance. For example, the controller 120 is configured to connect a requesting player to an expert over a communication session that is established to support the help session. The help session may be live with an expert providing live assistance, or the help session may be previously recorded.

Figure 1C:
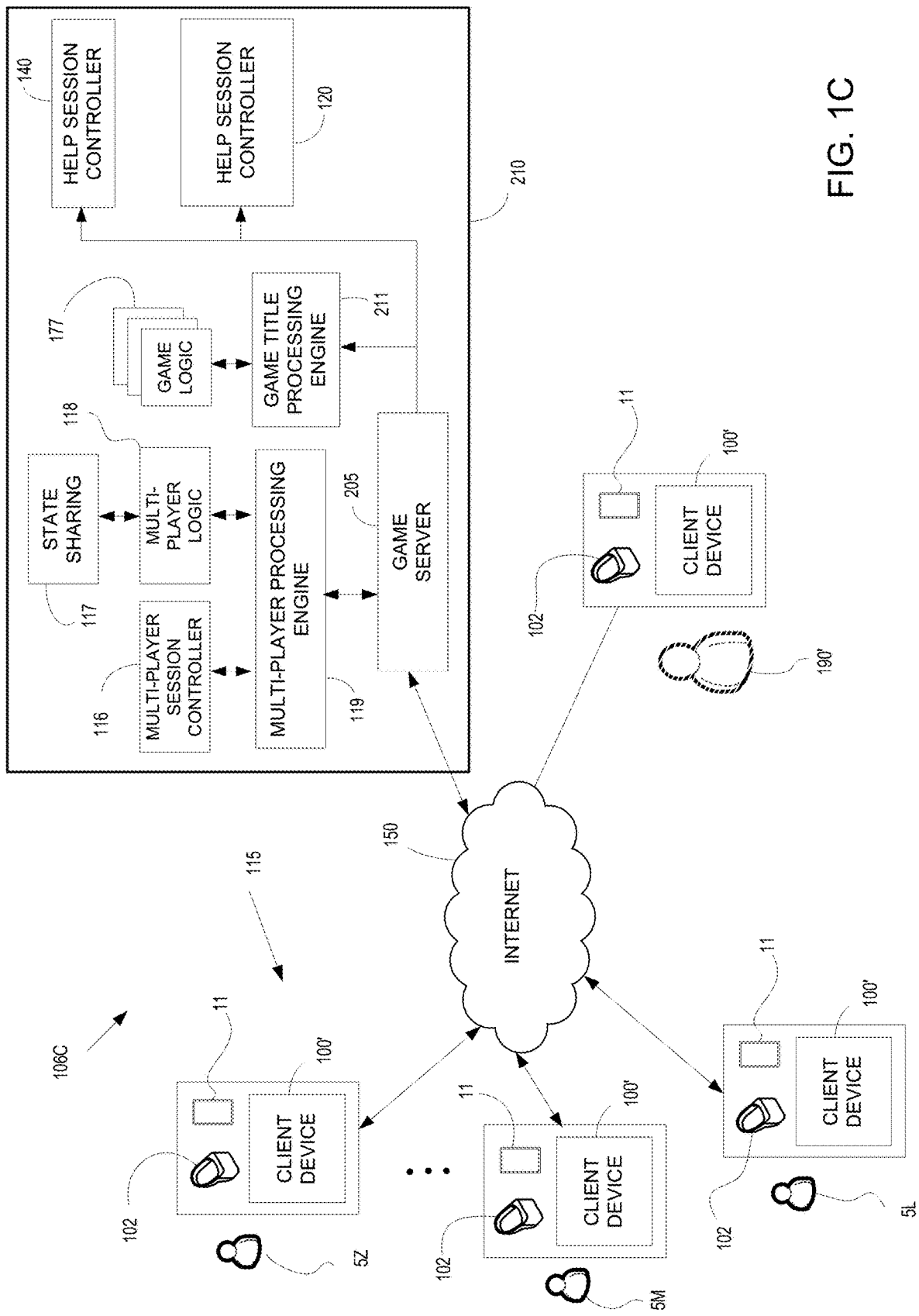
FIG. 1C illustrates a system providing real-time assistance during game play of a player playing a gaming application that is executed over a cloud game network by connecting the player to an expert over a communication session, in accordance with one embodiment of the present disclosure.

FIG. 1C illustrates a system 106C providing gaming control to a plurality of players 115 (e.g., players 5L, 5M . . . 5Z) playing a gaming application as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. In one embodiment, system 106C works in conjunction with system 10 of FIG. 1A and/or system 200 of FIG. 2 to provide real-time assistance during game play of a player playing a gaming application through a help session, such as connecting the player to the expert over a communication session or by providing a recorded help session. Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 115. In that manner, back-end server support provides streaming of media (e.g., video, audio, etc.) of game plays of a plurality of gaming applications to a plurality of corresponding users.

A plurality of players 115 accesses the game cloud system 210 via network 150, wherein players (e.g., players 5L, 5M . . . 5Z) access network 150 via corresponding client devices 100', wherein client device 100' may be configured similarly as client device 100 of FIGS. 1A-1B (e.g., including game executing engine 111, etc.), or may be configured as a thin client providing that interfaces with a back end server providing computational functionality (e.g., including game executing engine 211). In addition, each of the plurality of players 115 has access to a device 11, previously introduced, configured to facilitate a help session that connects a player to an expert over a communication session or by connecting to a recorded help session, as previously described. In particular, a client device 100' of a corresponding player 5L is configured for requesting access to gaming applications over a network 150, such as the internet, and for rendering instances of gaming application (e.g., video game) executed by the game server 205 and delivered to a display device associated with the corresponding player 5L. For example, player 5L may be interacting through client device 100' with an instance of a gaming application executing on game processor of game server 205. More particularly, an instance of the gaming application is executed by the game title execution engine 211. Game logic (e.g., executable code) implementing the gaming application is stored and accessible through data store 140, previously described, and is used to execute the gaming application. Game title processing engine 211 is able to support a plurality of gaming applications using a plurality of game logics 177, as shown.

In addition, expert 190' at some point may have been playing at least one gaming application in system 106B and has registered as an expert. For example, the expert 190' may be playing a corresponding gaming application with cooperation of the client device 100', as previously described. In that manner, a player currently playing a gaming application in system 106C may request through the help session controller 120, as previously described, and be connected with the expert 190' that when selected may provide assistance for the game play of the requesting player. When providing assistance, expert 190' may need not be supported by client device 100', and may participate in the corresponding help session using any device, such as device 11 (e.g., smartphone) or HMD 102.

As previously described, client device 100' may receive input from various types of input devices, such as game controllers, tablet computers, keyboards, gestures captured by video cameras, mice touch pads, etc. Client device 100' can be any type of computing device having at least a memory and a processor module that is capable of connecting to the game server 205 over network 150. Also, client device 100' of a corresponding player is configured for generating rendered images executed by the game title execution engine 211 executing locally or remotely, and for displaying the rendered images on a display. For example, the rendered images may be associated with an instance of the first gaming application executing on client device 100' of player 5L. For example, a corresponding client device 100' is configured to interact with an instance of a corresponding gaming application as executed locally or remotely to implement a game play of a corresponding player, such as through input commands that are used to drive game play.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, players in the session can communicate with each other as controlled by the multi-player session controller 116.

Further, multi-player processing engine 119 communicates with multi-player logic 118 in order to enable interaction between players within corresponding gaming environments of each player. In particular, state sharing module 117 is configured to manage states for each of the players in the multi-player gaming session. For example, state data may include game state data that defines the state of the game play (of a gaming application) for a corresponding player 115A at a particular point, as previously described. Further, state data may include user/player saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

In addition, back-end server support via the game server 205 may provide support services including providing real-time assistance during game play of a player playing a gaming application through a help session. As previously introduced, the help session controller 120 is configured to establish and manage one or more help sessions that provide assistance. For example, the controller 120 is configured to connect a requesting player to an expert over a communication session that is established to support the help session. The help session may be live with an expert providing live assistance, or the help session may be previously recorded.

Figure 2:
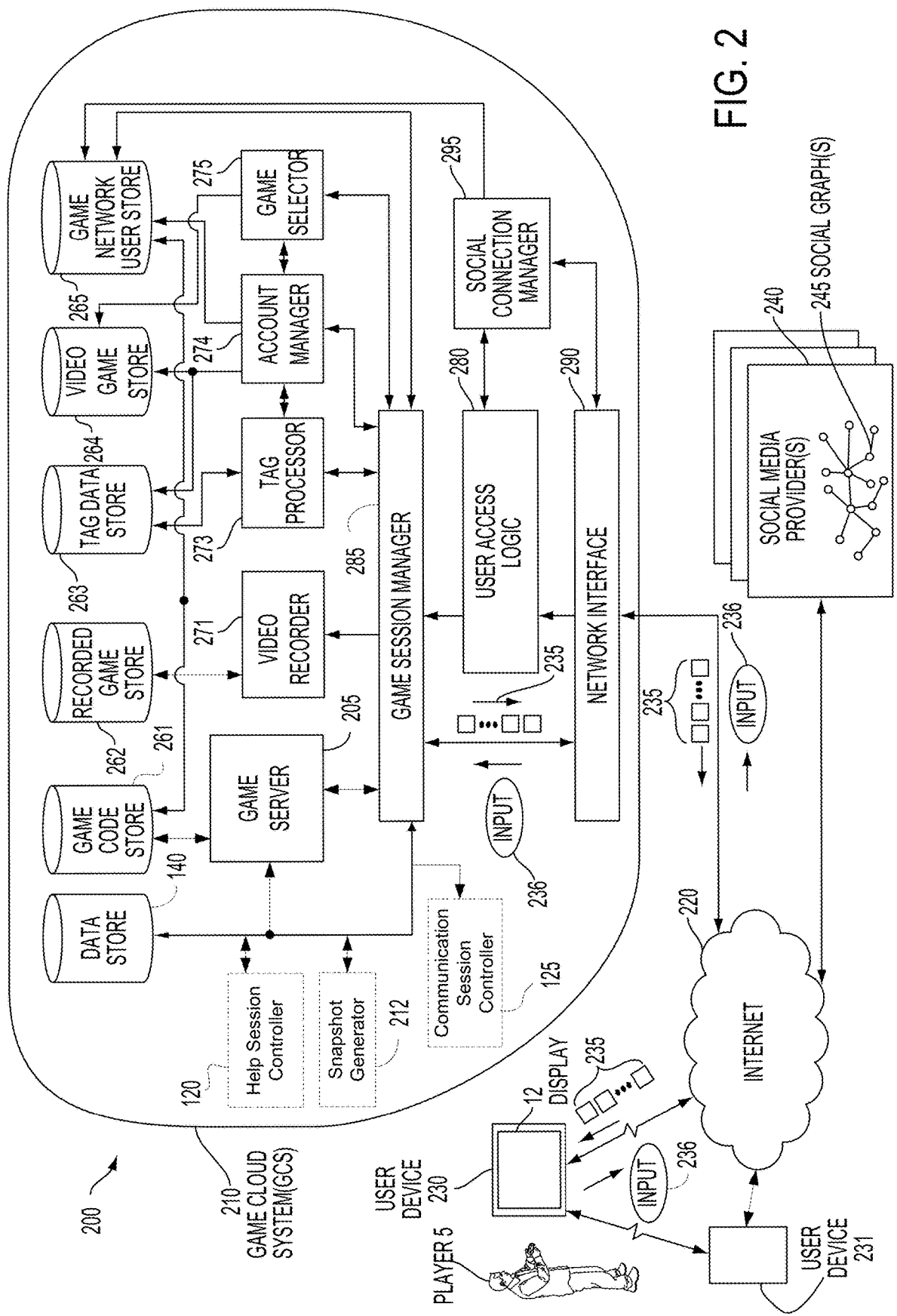
FIG. 2 illustrates a system diagram for enabling access and playing of gaming applications in a game cloud system (GCS), and implementation of a help session that provides real-time assistance during game play of a player playing a gaming application by connecting the player to an expert over a communication session, wherein the gaming application can be executing on a local computing device or over a cloud game network, in accordance with one embodiment of the present disclosure.

FIG. 2 illustrates a system diagram 200 for enabling access and playing of gaming applications stored in a game cloud system (GCS) 210, in accordance with an embodiment of the disclosure. Generally speaking, game cloud system GCS 210 may be a cloud computing system operating over a network 220 to support a plurality of users. Additionally, GCS 210 is configured to provide real-time assistance during game play of a player playing a gaming application by connecting the player to an expert over a communication session supporting a live help session, or by connecting the player to a recorded help session. For example, help session controller 120 is configured for establishing and managing help sessions. In addition, with cooperation of the help session controller 120, the communication session controller is configured for generating and managing communication sessions between players and experts over one or more help sessions. Also, GCS 210 is configured to capture and save game context information that is used to match a player requesting help to an expert that is best suited for providing assistance. For example, the expert may have recently played the same section of the gaming application using the same type of character with the same weaponry or set of assets. In one embodiment, the game context is captured based on snapshots that are generated during the game plays, as previously described. For example, snapshot generator 212 may be configured for generating and/or capturing snapshots of game plays of one or more users playing one or more gaming applications. One or more user devices may be connected to network 220 to allow players to access services provided by GCS 210 and social media providers 240.

In one embodiment, game cloud system 210 includes a game server 205, a video recorder 271, a tag processor 273, and account manager 274 that includes a user profile manager, a game selection engine 275, a game session manager 285, user access logic 280, a network interface 290, and a social media manager 295. GCS 210 may further include a plurality of gaming storage systems, such as a game state store, random seed store, user saved data store, snapshot store, which may be stored generally in datastore 140. Other gaming storage systems may include a game code store 261, a recorded game store 262, a tag data store 263, video game data store 264, and a game network user store 265. In one embodiment, GCS 210 is a system that can provide gaming applications, services, gaming related digital content, and interconnectivity among systems, applications, users, and social networks. GCS 210 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

User/player 5 is able to access services provided by GCS 210 via the game session manager 285. For example, account manager 274 enables authentication and access by player 5 to GCS 210. Account manager 274 stores information about member players. For instance, a user profile for each member user may be managed by account manager 274. In that manner, member information can be used by the account manager 274 for authentication purposes. For example, account manager 2274 may be used to update and manage user information related to a member user/player. Additionally, game titles owned by a member player may be managed by account manager 274. In that manner, gaming applications stored in data store 264 are made available to any member player who owns those gaming applications.

In one embodiment, a user, e.g., player 5, can access the services provided by GCS 210 and social media providers 240 by way of user device 230 through connections over network 220. User device 230 can include any type of device having a processor and memory, wired or wireless, portable or not portable. In one embodiment, user device 230 can be in the form of a smartphone, a tablet computer, or hybrids that provide touch screen capability in a portable form factor. One exemplary device can include a portable phone device that runs an operating system and is provided with access to various applications (apps) that may be obtained over network 220, and executed on the local portable device (e.g., smartphone, tablet, laptop, desktop, etc.).

User device 230 includes a display 232 that acts as an interface for player 5 to send input commands 236 and display data and/or information 235 received from GCS 210 and social media providers 240. Display 232 can be configured as a touch-screen, or a display typically provided by a flat-panel display, a cathode ray tube (CRT), or other device capable of rendering a display. Alternatively, the user device 230 can have its display 232 separate from the device, similar to a desktop computer or a laptop computer. Additional devices 231 (e.g., device 11 of FIG. 1A) may be available to player 5 for purposes of providing real-time assistance in support of game play of a player.

In one embodiment, user device 130 is configured to communicate with GCS 210 to enable player 5 to play a gaming application. In some embodiments, the GCS 210 may include a plurality of virtual machines (VMs) running on a hypervisor of a host machine, with one or more virtual machines configured to execute a game processor module utilizing the hardware resources available to the hypervisor of the host. For example, player 5 may select (e.g., by game title, etc.) a gaming application that is available in the video game data store 264 via the game selection engine 275. The gaming application may be played within a single player gaming environment or in a multi-player gaming environment. In that manner, the selected gaming application is enabled and loaded for execution by game server 205 on the GCS 210. In one embodiment, game play is primarily executed in the GCS 210, such that user device 230 will receive a stream of game video frames 235 from GCS 210, and user input commands 236 for driving the game play is transmitted back to the GCS 210. The received video frames 235 from the streaming game play are shown in display 232 of user device 230. In other embodiments, the GCS 210 is configured to support a plurality of local computing devices supporting a plurality of users, wherein each local computing device may be executing an instance of a gaming application, such as in a single-player gaming application or multi-player gaming application. For example, in a multi-player gaming environment, while the gaming application is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player gaming application. In that manner, the cloud game network coordinates and combines the game plays for each of the users within the multi-player gaming environment.

In one embodiment, after player 5 chooses an available game title to play, a game session for the chosen game title may be initiated by the user $U_0$ through game session manager 285. Game session manager 285 first accesses game state store in data store 140 to retrieve the saved game state of the last session played by the user $U_0$ (for the selected game), if any, so that the player 5 can restart game play from a previous game play stop point. Once the resume or start point is identified, the game session manager 285 may inform game execution engine in game processor 201 to execute the game code of the chosen game title from game code store 261. After a game session is initiated, game session manager 285 may pass the game video frames 235 (i.e., streaming video data), via network interface 290 to a user device, e.g., user device 230.

During game play, game session manager 285 may communicate with game processor 201, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data stored 263.

During game play, game session manager 285 may communicate with game processor 201 of game server 205 to deliver and obtain user input commands 236 that are used to influence the outcome of a corresponding game play of a gaming application. Input commands 236 entered by player 5 may be transmitted from user device 230 to game session manager 285 of GCS 210. Input commands 236, including input commands used to drive game play, may include user interactive input, such as including tag content (e.g., texts, images, video recording clips, etc.). Game input commands as well as any user play metrics (how long the user plays the game, etc.) may be stored in game network user store. Select information related to game play for a gaming application may be used to enable multiple features that may be available to the user.

Because game plays are executed on GCS 210 by multiple users, information generated and stored from those game plays enable any requesting user to experience the game play of other users, particularly when game plays are executed over GCS 210. In particular, snapshot generator 212 of GCS 210 is configured to save snapshots generated by the game play of users playing gaming applications through GCS 210. In the case of player 5, user device provides an interface allowing player 5 to engage with the gaming application during the game play. Snapshots of the game play by user $U_0$ is generated and saved on GCS 210. Snapshot generator 212 may be executing external to game server 205 as shown in FIG. 2, or may be executing internal to game server 205.

In addition, the information collected from the game plays of players and experts may be used to match a player to an expert when the player is requesting help. In that manner, the expert is best able to provide assistance to the player given a particular game context experienced by the player, wherein the expert is selected from a pool of experts. For example, the selected expert may have played the same gaming application using the same character, and using the same assets (e.g., weapons, etc.), using approximately the same skills, etc. In addition, the expert may have recently played the same level so that the gaming application is fresh in the mind of the expert. Because the expert has recently played the gaming application, this may reduce the chance of the expert revealing any spoilers, as the expert may not have had a chance to experience any spoiler information.

In implementations, the help session may be delivered over a network 220 to the user device 231 or user device 230 for establishing the communication session of the help session (e.g., voice, text, video, etc.). For example, the help session may be presented to user device 230 (e.g., display connected to a gaming console or client device). In another example, the help session may be presented to user device 231 used in establishing a communication session (e.g., providing text, audio, video, etc.). User device 231 may be a mobile device (e.g., smartphone), such as a device used by an expert during a help session. In that case, the expert need not have access to a gaming console or client device as the expert is not playing the gaming application per se.

FIGS. 3-8 are described within the context of a user playing a gaming application. In general, the gaming application may be any interactive game that responds to user input. In particular, FIGS. 3-8 describe how a player playing a gaming application may receive real-time assistance either through connecting with an expert over a live help session, or by providing access to a recorded help session.

Figure 3A:
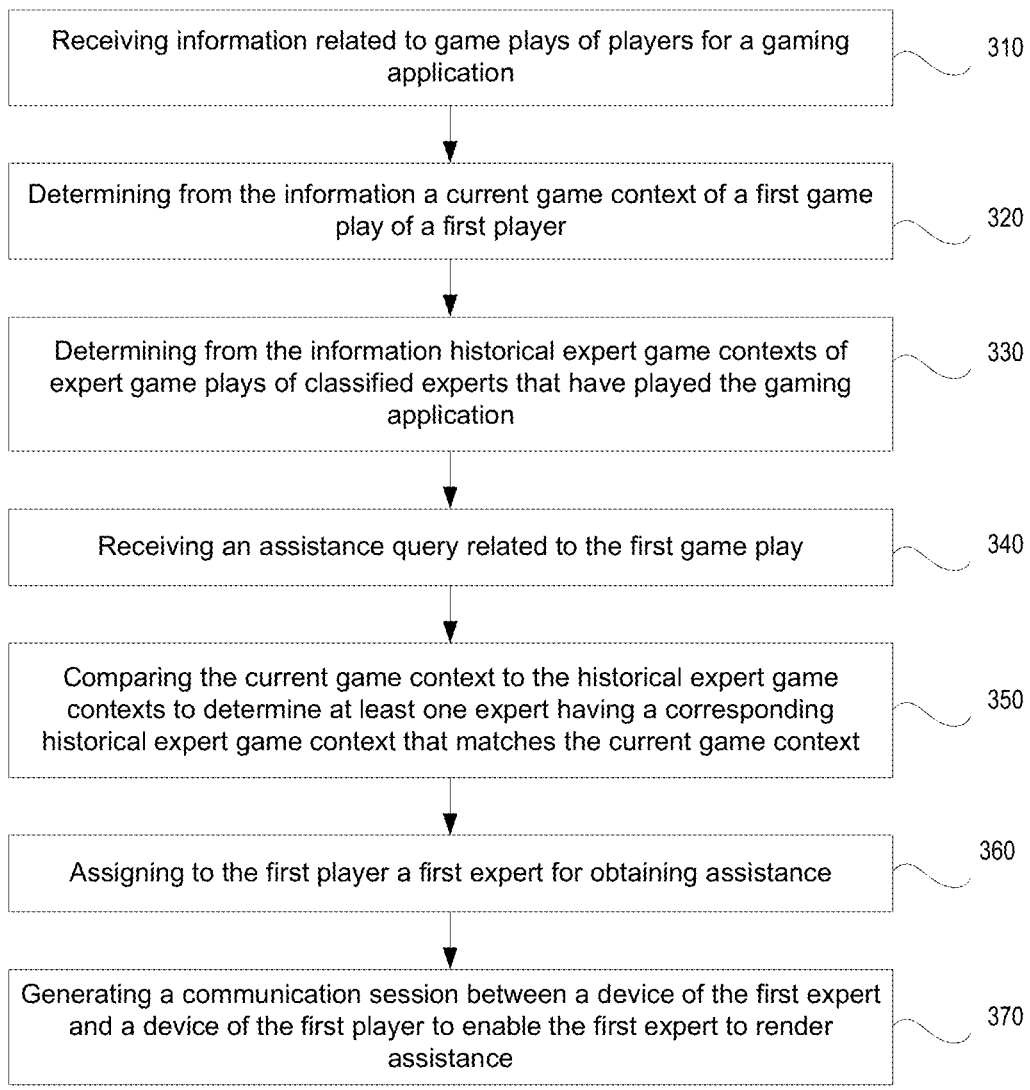
FIG. 3A is a flow diagram illustrating steps in a method for providing real-time assistance during game play of a player playing a gaming application by connecting the player to an expert over a communication session, in accordance with one embodiment of the present disclosure.

With the detailed description of the various modules of the gaming server and client device communicating over a network, a method for providing gaming assistance supporting game play of a corresponding player is now described in relation to flow diagram 300A of FIG. 3A, in accordance with one embodiment of the present disclosure. Flow diagram 300A illustrates the process and data flow of operations involved at the game server side for purposes of connecting a player playing a gaming application to an expert providing assistance (e.g., through a live help session) or to a recorded help session. The help session may be transmitted to a device of the player that may be separate from another device displaying the game play of the player playing a gaming application. In particular, the method of flow diagram 300A may be performed at least in part by the help session controller 120 of FIGS. 1A-1C and 2.

At 310, the method includes receiving over a network at a back-end server information related to a plurality of game plays of a plurality of players for a gaming application. The players may be currently playing the gaming application, or have played the gaming application. In some embodiments, the information includes the game plays. In some embodiments, the information includes metadata and/or information generated relating to the game play, such as game state data. For example, the information may include game state information and user/player saved information, as previously described. The information may include snapshot information that could provide information enabling execution of an instance of the video game beginning from a point in the video game associated with a corresponding snapshot. For example, the game state information may define the state of the game play at a corresponding point, to include character information (e.g., type, race, etc.), the gaming application, where the character is located, what level is being played, assets of the character, game objects, game object attributes, game attributes, game object state, graphic overlays, character assets, skill set of character, geographic location of character in gaming environment/world, the current quest and/or task presented to the player, loadout, skills set of the character, etc. The game state data allows for generation of the gaming environment that existed at the corresponding point in the game play. Further, user/player information that related to the player may include information that personalizes the video game for the corresponding player, such as skill or ability of the player, the overall readiness that the player seeks help, recency of playing the gaming application by the player, game difficulty selected by the user 5 when playing the game, game level, character attributes, character location, number of lives left, the total possible number of lives available, armor, trophy, time counter values, and other asset information, etc.

At 320, the method includes determining from the information a current game context of a first game play of a first player. The first game context is related to the current state of the game play of the first player. Specifically, information is received relating to a current game play of a first player. In one case, the current game play is live, such that the first player is currently playing the gaming application. Game context defines the gaming environment at a particular point in the game play. A current game context defines the gaming environment at a current point in a corresponding game play. Game contexts may be defined for one or more points in a corresponding game play. For example, the game context may define the character of a player, the various characteristics of that player, the assets associated with that player, the tasks presented to the player, etc. The game context may be based or closely related to the previously received metadata and/or information generated relating to the game play.

At 330, the method includes determining from the information a plurality of historical expert game contexts of a plurality of expert game plays of experts that have played the gaming application. In one implementation, an expert may also be currently playing the gaming application and generating new historical expert game contexts through the corresponding game play. The expert game plays are generated from players classified as experts for the gaming application. As previously described, generally game contexts may be defined for one or more points in a corresponding game play, such as those for one or more experts. The expert game plays are taken from the plurality of game plays, and specifically from game plays of players classified as experts. A player may be classified through self-registration, through qualification, or through any other method. In one embodiment, the expert game contexts have been simultaneously determined when determining game contexts of the plurality of game plays of all the players. As such, once a player is classified as an expert, the game context information of the corresponding game player of the expert can be identified as one or the expert game contexts. In addition, the game context information may be determined for multiple points during the corresponding game play. For example, game context information for a first expert may include first game context at a first point in the game play, second game context at a second point in the game play . . . and Nth game context at an Nth point in the game play. For example, the game play for a corresponding expert may have a plurality of game contexts, including game contexts for facing a boss at level 1, facing a boss at level 2, progress within a given side quest, etc. When multiple players have been classified as experts, the game context information for each expert may be determined.

Classified experts for a particular gaming application make up a set of the plurality of players. As previously described, the experts may be self-registered, such as without any qualifying criteria. In another implementation, the experts may have some qualification, such as skill of player, accomplishing a task, finishing a quest, finishing a portion of the game within a time period, finishing the game within a time period, etc., as previously described. After reaching the qualification, the expert may self-register, and/or may automatically be labeled as an expert (e.g., with authorization).

Different players and/or experts playing the same gaming application may have the same or similar game contexts within their corresponding game plays. For example, by collecting game contexts of multiple players all playing the same gaming application, game plays of different players may be aligned as having similar characters with the same assets, similar playing styles of different players, similar routing through the gaming world of a gaming application, etc. Game context information may be used to match a player with another player that is classified as an expert (e.g., self-registration, qualified, etc.), such that the expert is able to provide assistance in the game play of the player requesting the assistance, as will be described below.

At 340, the method incudes receiving an assistance query related to the first game play. That is, the first player is also making a request for assistance, or making a request notification, etc. For example, the query may be specifically directed to how to beat a particular point in the game (e.g., level boss, quest, task, etc.), or may be directed to gaining information about an object (e.g., a boss's name, an object encountered in the game play, or may be directed to an overall objective for the player at this point in the gaming application.

In addition, the current game context of the first player is related to the state of the game that is closest to the point in the game play from which the request is made. For example, the game context may provide information relating to the character of the first player, the assets held by the character, the level in the gaming application encountered by the character, and the scene in the level. Any query or request for assistance by the first player would necessarily be related to the current game context. As such, the game play of another player (e.g., a classified expert, friend, etc.) that has a game context that closely matches the current game context of the first player may have knowledge of the gaming application that is helpful to the first player.

At 350, the method includes comparing the current game context of the first player (requesting help) to the plurality of historical expert game contexts to see how closely the expert matches the first player, such as in relation to game context of respective game players. That is, the comparison determines how closely the game play of each expert matches the game play of the first player. In one embodiment, the comparison is performed for each game context captured for a particular expert, and the closest game context to the first game context of the first player is used as being representative of that expert. In another embodiment, the game context information collected at various points during the game play of a particular expert may be combined and used for comparison to the first game context of the first player. In one implementation, at least one expert is determined having a corresponding historical expert game context that matches the first game context.

At 360, the method includes assigning to the first player a first expert for obtaining assistance. That is, the first expert can then provide assistance to the first player in relation to his or her game play. Various methods of selection can be implemented for purposes of selecting the first expert from the pool of experts. For example, the first expert is selected based on the game contexts of the first player and experts in the set/pool of experts.

In one embodiment, the first expert is selected based on the quality of the matching between game contexts. For instance, the set of matched expert game contexts has matching values indicating the quality of matching the corresponding expert game context to the first game context, as will be further described in relation to FIG. 3B. For example, the method determines a first matching value having the highest value. The first matching value corresponds to an expert game context. In one case, the first matching value corresponds to the first expert game context of the first expert. As such, the first expert is selected for the help session, wherein the first expert is best suited from the pool of experts to provide help to the first player, based on game contexts.

In another embodiment, the first expert from the pool of experts is selected based on an availability factor. This provides a straightforward approach to matching experts to players requesting help. In particular, this approach may be beneficial when the gaming application is first released. Because of the recent release, there may not be many experts who have registered, and it may be difficult to do any comparisons between experts due to the lack of information. In one implementation, the first available expert is selected and assigned to the first player for the help session.

Figure 3B:
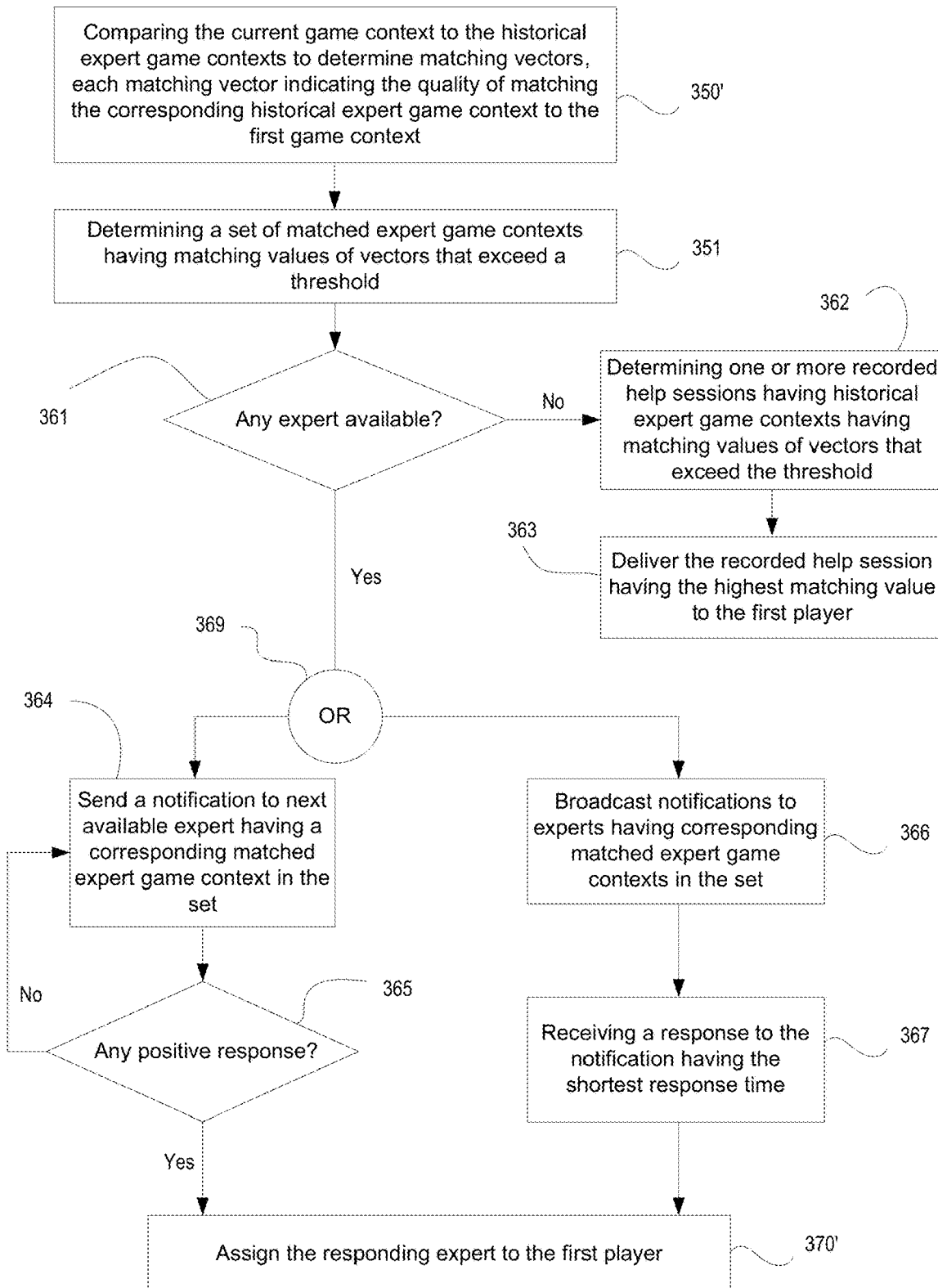
FIG. 3B is a flow diagram illustrating steps in a method for determining the form of assistance being provided to a player playing a gaming application and requesting assistance, in accordance with one embodiment of the present disclosure.

In other embodiments, an expert is selected based on response times, such as in a race to respond from qualified and/or available experts who are most likely to be able to help, as will be further described in FIG. 3B. In another embodiment, experts are polled one at a time to determine whether they want to provide assistance. During the polling process, the first expert to respond affirmatively is assigned to provide assistance, as will be further described in FIG. 3B.

In particular, at 370, the method includes generating a communication session that connects the first player and the first expert. In one embodiment, a communication session manager at the back-end server acts as an intermediary for establishing and managing the communication session. At least, the communication session is established between a device of the first expert and a device of the first player. The communication session is used to enable the expert to provide assistance to the player, such as through a help session between the first expert and the first player. In one embodiment, the communication session is configured for text, audio, video, embedded audio and video, etc. For example, the method may include one or more of establishing a voice channel, may include establishing a text channel in the communication session, may include establishing a video channel (e.g., embedded video) configured for a video chat. Also, the communication session manager may act to create new sessions to allow for the different forms of communication, such as providing ShareScreen functionality, SharePlay functionality, etc. In one embodiment, the communication session may be a peer-to-peer connection or may include the back-end server acting as an intermediate node. That is, once created by the communication session manager the communication session is a direct communication path between devices of the first player and the first expert. In another embodiment, the communication session may flow through the back-end server.

In one embodiment, the first expert may share the screen of the first player, such as through a share screen functionality, as previously described. By viewing the game play of the first player, the first expert may gain a better sense of the problem facing the first player, and therefore provide better help. The share screen functionality is implemented through the communication session, in one embodiment. The request to share the screen may be made by either the first player or the first expert. For example, the first expert may make a request to share video of the game play of the first player. In one implementation, the request is received by the help session controller at a back-end server. A notification of the request is sent to the device of the first player. For instance, the notification may be delivered from the help session controller. Authorization is received by the help session controller from the device of the first player, wherein the authorization is provided by the first player to share the video of the game play with the expert. As such, the game play of the first player is streamed to the device of the first expert. For example, the help session controller is able to facilitate the streaming through the communication session, or through an independent streaming channel.

In another embodiment, the first expert may take control the game play of the first player, such as through a share play functionality, as previously described. By share play, the expert may take over control of the game play, for example to complete an objective that the first player is unable to perform. The request to share play may be made by either the first player or the first expert. For example, a request from the device of the first expert is received, wherein the request asks to share control of the game play of the first player. The request from the expert may be in the form of an offer of assistance from the expert to accomplish the objective within the game play of the user. The request may be received by the help session controller at the back-end server. A notification of the request may be generated by the help session controller, and delivered to the device of the first player from the help session controller. Authorization is received by the help session controller from the device of the first player, wherein the authorization is provided by the first player to share control of the game play with the expert. In that manner, the expert is able to take control of the game play by submitting gaming input commands In one embodiment, a set of input controls or commands are received by the help session controller from the device of the first expert. A block is placed on input commands from the input controller of the first player, such that the gaming engine (e.g., local console or back-end gaming processor) blocks input commands originating from the controller device of the first player, and passes through input commands originating from the controller device of the first expert. For example, the help session controller may send an instruction to the processor (e.g., gaming engine) executing the gaming application for the game play of the first player to block input controls associated with the first player. As such, the set of input controls from the controller device of the first expert is delivered to the processor (e.g., gaming processor) executing the gaming application for the game play of the first player. In addition, control may be passed back to the first player at any point. For example, the first player may have the ability to take back control the game play at any time (such as, using a kill command), as previously described.

FIG. 3B is a flow diagram 300B illustrating steps in a method for determining the form of assistance being provided to a player playing a gaming application and requesting assistance, in accordance with one embodiment of the present disclosure. Flow diagram 300B illustrates the process and data flow of operations involved at the game server side for purposes of connecting a player playing a gaming application to an expert providing assistance (e.g., through a live help session) or to a recorded help session. The help session may be transmitted to a device of the player that may be separate from another device displaying the game play of the player playing a gaming application. Flow diagram 300B may be implemented in cooperation with flow diagram 300A, such that flow diagram 300B is an extension of flow diagram 300A, in one embodiment. In particular, the method of flow diagram 300B may be performed at least in part by the help session controller 120 of FIGS. 1A-1C and 2.

At 350', the method includes determining a plurality of matching vectors when performing the matching previously described in 350. That is, a plurality of matching vectors is determined between the first game context and the plurality of historical expert game contexts. Each matching vector is associated with a corresponding historical expert game context of a corresponding expert. Also, each matching vector having a matching value (e.g., a quality factor or Q-factor) indicating the quality of matching the corresponding historical expert game context to the first game context.

At 351, the method includes determining a set of matched historical expert game contexts having matching values that exceed a threshold. This filters the set/pool of experts to a smaller set of experts that more closely matches the first game context of the first player. Experts in the smaller set, or those whose expert game contexts have matching values that exceed the threshold are better suited to providing help to the first player, given the current context of the game play of the first player.

At decision step 361, the method determines whether any experts in the smaller set of experts are available to provide assistance in a timely manner (e g, immediately, in 5 minutes, etc.). For example, there may be much activity in the first 6 months to a year of a gaming application, and experts are readily available to provide fresh and knowledgeable assistance. Beyond that timeframe, the assistance provided by experts may be stale and these experts may be less available. For example, those experts may need some time to come up to speed when providing assistance.

If no expert is available to provide live assistance, then the method proceeds to 362 to determine one or more recorded help sessions having historical expert game contexts that have matching values of vectors that exceed the threshold. For example, the historical expert game contexts may be analyzed as per 350' and 351 described above. At 363, a recorded help session that is best suited for responding to the assistance query of the first player is streamed to the device of the first player. For example, the selected recorded help session may have the highest matching value.

On the other hand, if there is an expert available to provide live assistance, the method can take one or more paths for selecting an expert as indicated at the "OR" step 369. In one embodiment, an expert is selected based on response times. For example, when a player requests help for that game, the request is sent to the available experts who are most likely to be able to help, such as the previously determined smaller set of experts. In one implementation, at 366 a broadcast is performed providing notification of the help session that is generated in response to the query from the first player. The notification is broadcast to a plurality of devices of the set of matched experts corresponding to the set of matched expert game contexts (e.g., those meeting the threshold), previously described. In one implementation, at 367 the first expert to accept the help request is selected and assigned to the help session with the first player. For instance, in a race of responses, determining that a first response to the notification has the shortest response time (e.g., from all the received responses), wherein the first response is received from the first expert. At 370', the responding expert is assigned to the first player for obtaining the assistance.

In another embodiment, at 364 the method includes sending a notification to the next available expert in the smaller set of experts (e.g., having matched historical expert game contexts having matching values that exceed a threshold). The next available expert may be determined based on having the highest matching value of the remaining experts (those not notified) in the smaller set. At decision step 365, the method determines if any positive response is received from the next available expert. If not, the method returns to 364 to resend the notification to the newly selected "next available expert," as previously described. If yes, the method proceeds to 370' wherein the responding expert is assigned to the first player for obtaining assistance.

Figure 4A:
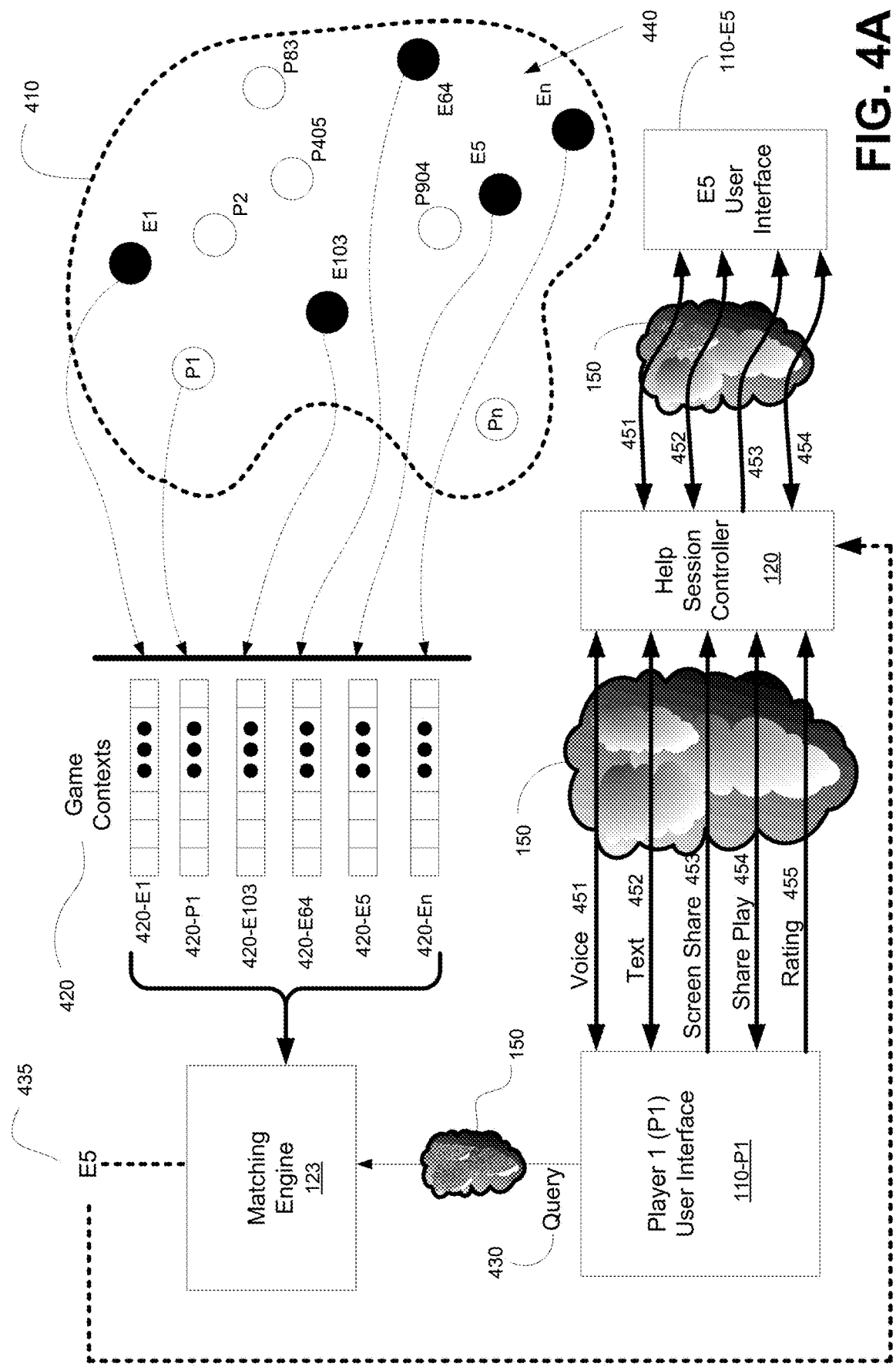
FIG. 4A is a data flow diagram illustrating the flow of data in a system or method providing real-time assistance during game play of a player playing a gaming application by connecting the player to an expert over a communication session, in accordance with one embodiment of the present disclosure.

FIG. 4A is a data flow diagram illustrating the flow of data in a system or method providing real-time assistance during game play of a player playing a gaming application by connecting the player to an expert over a communication session, in accordance with one embodiment of the present disclosure. FIG. 4 may be representative of the flow of data through the systems and methods of FIGS. 1A-1C and 2 in embodiments.

As shown, player 1 (P1) is playing a gaming application. Player P1 may encounter a roadblock during his or her game play, and request information and/or assistance. For instance, a query from player P1 is made through user interface 110-P1 and delivered through network 150 back to the help session controller 120 of a back-end server, as previously described. In particular, the matching engine 123 in cooperation with the help session controller 120 is configured to match game contexts of the player P1 and a pool of experts 440. The pool of experts is taken from a plurality of players 410, wherein the players are playing one or more gaming applications. The experts in the pool 440 all have played the gaming application, and for example are registered as experts of the gaming application. For example, pool 440 includes one or more experts E1 . . . E5 . . . E103 . . . $E_n$.

Game contexts 420 is input into the matching engine 123 for comparison. For example, the input includes game context 420-P1 for player P1, game context 420-E1 for expert E1, game context 420-E103 for expert E103, game context 420-E64 for expert E64, game context 420-E5 for expert E5 . . . and game context 420-En for expert En. The matching process performed by matching engine was previously described. Basically, the game context 420-P1 of player P1 is compared to each of the game contexts associated with the pool of experts 440. Matching vectors are determined for each of the game contexts, wherein each matching vector has a corresponding matching value (e.g., quality factor or Q-factor) indicating the quality of matching the corresponding expert game context to the game context 420-P1 of player P1.

The matching engine 123 is configured to select one of the experts from the pool of experts 440. As shown, expert E5 is selected, and provided as an output 435 from the matching engine 123. The output 435 is provided to the help session controller 120 for purposes of generating and managing the help session providing assistance to player P1. As previously described, one or more methods may be implemented for selection of the expert. For example, the pool of experts 440 may be further filtered by applying a threshold to the matching values, wherein experts associated with matching values that meet the threshold criteria are considered for selection. In one implementation, the highest quality matching value is used for selection of the expert. That is, the highest matching value is used for selection. In another example, a notification of a help session request is delivered to experts associated with matching values that meet the threshold criteria. The expert that responds first to the notification may be selected for the help session. In still another example, any of the experts associated with matching values that meet the threshold criteria may be selected, such as through random selection, first selection, etc. A further discussion of the game contexts 420 and the matching process of the matching engine 123 is provided in relation to FIGS. 5A-5B.

In one embodiment, rather than matching the player P1 to an expert, the matching engine 123 may select a friend of the expert from a pool of friends. For example, the friends may be social network friends established through one or more social networks.

The help session controller is configured to establish and manage a help session to provide real-time assistance to player P1. For example, a communication session is generated between a device of player P1 (e.g., the user interface 110-P1) and a device of the expert E5 (e.g., the user interface 110-E5). In one embodiment, the communication session is generated between a communication session manager of the help session controller 120, the device of the player P1 and a device of the expert E5. In another embodiment, the communication session is generated and establishes direct communication between the device of player P1 and the device of expert E5.

One or more communication channels may be established in the communication session. For example, one or more of a voice channel 451, a text channel 452, a screen share channel 453, and/or a share play channel may be established. As shown, the voice channel 451 is a two-way communication path so that player P1 and expert E5 can talk to and listen to each other's voice communication. Also, the text channel 452 is a two-way communication path so that the player P1 and expert E5 can communication with each other by texting. In addition, the screen share channel 453 may be a one-way communication path so that video from the game play of player P1 is delivered to the device of expert E5 for viewing. Further, the share play channel 454 may be a two-way communication path so that input controls may be communicated from the expert E5 to the gaming engine local to the player P1, or to another gaming engine at a back-end server.

Separate control channel may be established to pass control and other information between the help session controller 120 and user interface 110-P1 or to user interface 110-E5. For example, instructions may be delivered to the user interface 110-P1 that block input controls originating from player P1, or to send video over the screen share channel 453. In addition, rating information may be delivered over the channel 455 providing rating information. For example, after the help session, the player P1 may provide a rating of the help session over channel 455. In addition, player P1 may provide a rating of the overall performance of expert E5 (e.g., personality, helpfulness, ability to control the release of spoilers, depth of knowledge for the gaming application, etc.). Also, expert E5 may provide a rating of the player P1 (e.g., level of cooperation, ability to accept help, personality, gratitude, etc.).

In one embodiment, the help session is implemented on a second computing device associated with the player P1 concurrent with the game play of the user. For example, in one embodiment there may be two communication channels delivering information, such as a first communication channel established to deliver data representative of game play of the user to a first computing device of player P1, and a second communication channel established to deliver data associated with the help session to the second computing device of player P2. For example, the first computing device may be a local gaming console and/or display, and the second computing device may be a smartphone. In another embodiment, the help session may be delivered along with the data representative of game play of the user, such as through a split screen including a first screen showing the game play and a second screen showing the help session.

Figure 4B:
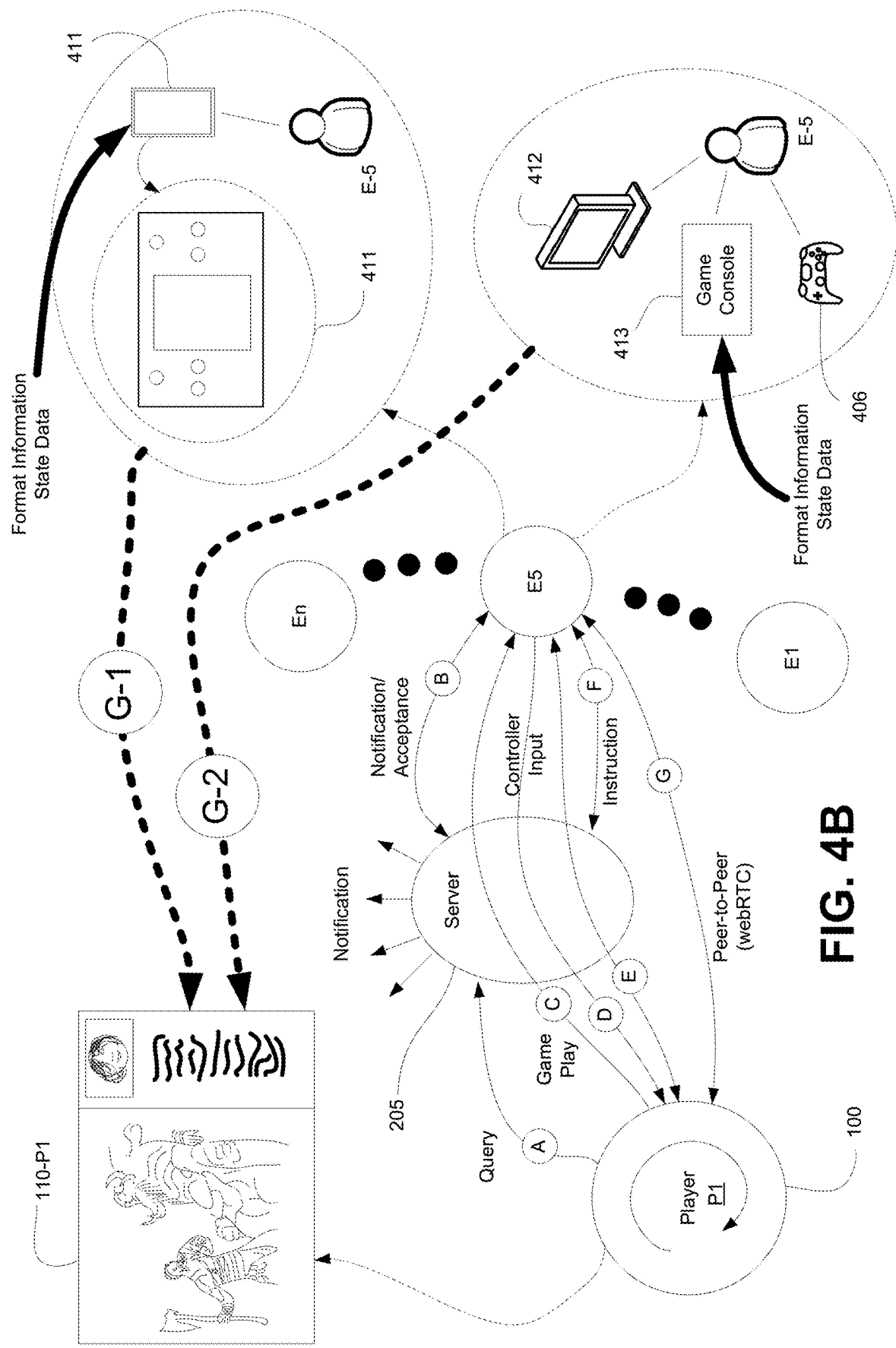
FIG. 4B is a data flow diagram illustrating the game play of an expert playing a gaming application executing locally using game state data confined to the context of a player requesting assistance, wherein the game play of the expert is streamed to the player, in accordance with one embodiment of the present disclosure.

FIG. 4B is a data flow diagram illustrating the game play of an expert E-5 playing a gaming application executing locally using game state data confined to the context of a player P1 requesting assistance, wherein the game play of the expert E5 is streamed to the player P1, in accordance with one embodiment of the present disclosure. FIG. 4B provides further illustration of the flow of information between the player P1 and the selected expert E5 as described in FIG. 4A.

As shown, player P1 is sending a query that requests assistance during a game play of the player playing a gaming application. The query is delivered to a back-end server 205 over path "A", such as through a local computing device 100 of the player P1. The local computing device 100 may be a gaming console, wherein the gaming application may be executing on the device 100, or may be executing in a cloud gaming network communicating with local device 100. Server 205 sends a notification to one or more experts E1, E2 . . . En, as previously described. For example, the notification may be broadcast to multiple experts or to one expert at a time. For example, a notification is delivered to a device of expert E5 along path "B", and an acceptance of the request to provide assistance is also delivered back to the server 205 along path "B". Instructions and/or communication may be passed between the server 205 and the device of expert E5 over path "F". For example, the instructions may be used to establish one or more communication sessions.

At this point, server 205 may establish a communication session for expert E5 to provide assistance to player P1. In one embodiment, the communication session is established between devices of the player P1 and expert E5 through server 205 (e.g., paths "C", "D", and "E"). In another embodiment, the communication session is established between devices of player P1 and expert E5 through a peer-to-peer network connection (e.g., path "G"). For example, the peer-to-peer network connection may be a WebRTC (web real-time communication) connection that allows web browsers and mobile applications on one more devices to commutation with real-time communication (RTC) through application programing interfaces (APIs).

As previously described, various forms of communication may be used to enable the expert E5 to provide assistance, such as over path "E", including text, voice, video, video chat, etc. In one embodiment, a ShareScreen request is made to share the game play of player P1 with expert E5, wherein the game play (e.g., video, audio, etc.) may be delivered from the device 100 of player P1 to device of expert E5 over path "C", or through peer-to-peer connection path "G". In addition, a SharePlay request may be made to share the controls of the game play between player P1 and expert E5, wherein the controller input by the expert E5 is used to control the game play. In that case, the controller input is delivered from the device of expert E5 to the device 100 of player P1 over path "D", or through peer-to-peer connection path "G". In one embodiment, the communication provide through paths "C", "D", and/or "E" may be provided over peer-to-peer connection path "G".

In still another embodiment, to protect the game play of the player P1, the expert E5 generates an independent expert game play that is limited to the current context of the player P1, such that the game play of expert E5 can be focused on providing assistance to the player P1 that is relevant to the assistance query. For example, the player P1 may not want anyone to contaminate his or her game play, such that player P1 wants to finish the gaming application without an expert playing the game play to get through a difficult task. The player P1 may want to see how a difficult task may be performed and/or beaten. As such, limited state information may be provided to a device of the expert E5. The limited state information may be game state data that provides just enough information to replicate the current context of player P1 on the device of expert E5. In that manner, the expert E5 can play the gaming application on a local device to generate expert game play for the current context, and stream the expert game play back to the player P1.

For example, the expert E5 may be using a local mobile device 411 to provide gaming assistance, in accordance with one embodiment of the present disclosure. The mobile device 411 may be a tablet, or mobile phone, etc. The limited state information is loaded onto the mobile device 411 to execute the gaming application within the limited current context. The limited state information may include formatting data so that the gaming application may be executed within and displayed on device 411. In addition, input control buttons may be generated and displayed on a touch surface of device 411 so that the expert E5 can generate input controls. As shown, the game play of expert E5 as executed on mobile device 411 is delivered to device 100 of player P1 for interaction (e.g., viewing, etc.). For example, player P1 is viewing the expert game play E5 on user interface 110-P1, as previously introduced. User interface 110-P1 may have one or more windows showing the expert game play, communication from the expert E5 (e.g., video chat, text, voice, etc.), input controller sequence, etc. The streamed information may be provided in a peer-to-peer connection (e.g., WebRTC) over path G1, or through a communication session having the server as an intermediary node.

In another embodiment, the expert E5 may have access to a local computing device, such as game console 413, or computer processor. Expert E5 may be playing the same gaming application or a different application, or may be readily available to play any gaming application through game console 413, controller 406, and display 412. Upon receiving the notification, the server 205 may send instructions to the game console 413 to load up the gaming application. The game state relating to the current context of player P1 may also be loaded. In one case, the gaming application is available to the game console 413, such as through local memory, or through cloud gaming network services. In that manner, if the expert E5 is requested to provide assistance through his or her own game play, the gaming application is ready to receive control input for the given current context. The game console may receive formatting information so that the gaming application can execute on the game console 413 and be responsive to controller input provide by the controller 406. As shown, the game play of expert E5 as executed on gaming console 413 (or in cooperation with gaming console 413, such as executing on a cloud gaming network) is delivered to device 100 of player P1 for interaction (e.g., viewing, etc.). For example, player P1 is viewing the expert game play E5 on user interface 110-P1, as previously introduced. User interface 110-P1 may have one or more windows showing the expert game play, communication from the expert E5 (e.g., video chat, text, voice, etc.), input controller sequence, etc. The streamed information may be provided in a peer-to-peer connection (e.g., WebRTC) over path G2, or through a communication session having the server as an intermediary node.

Figure 5A:
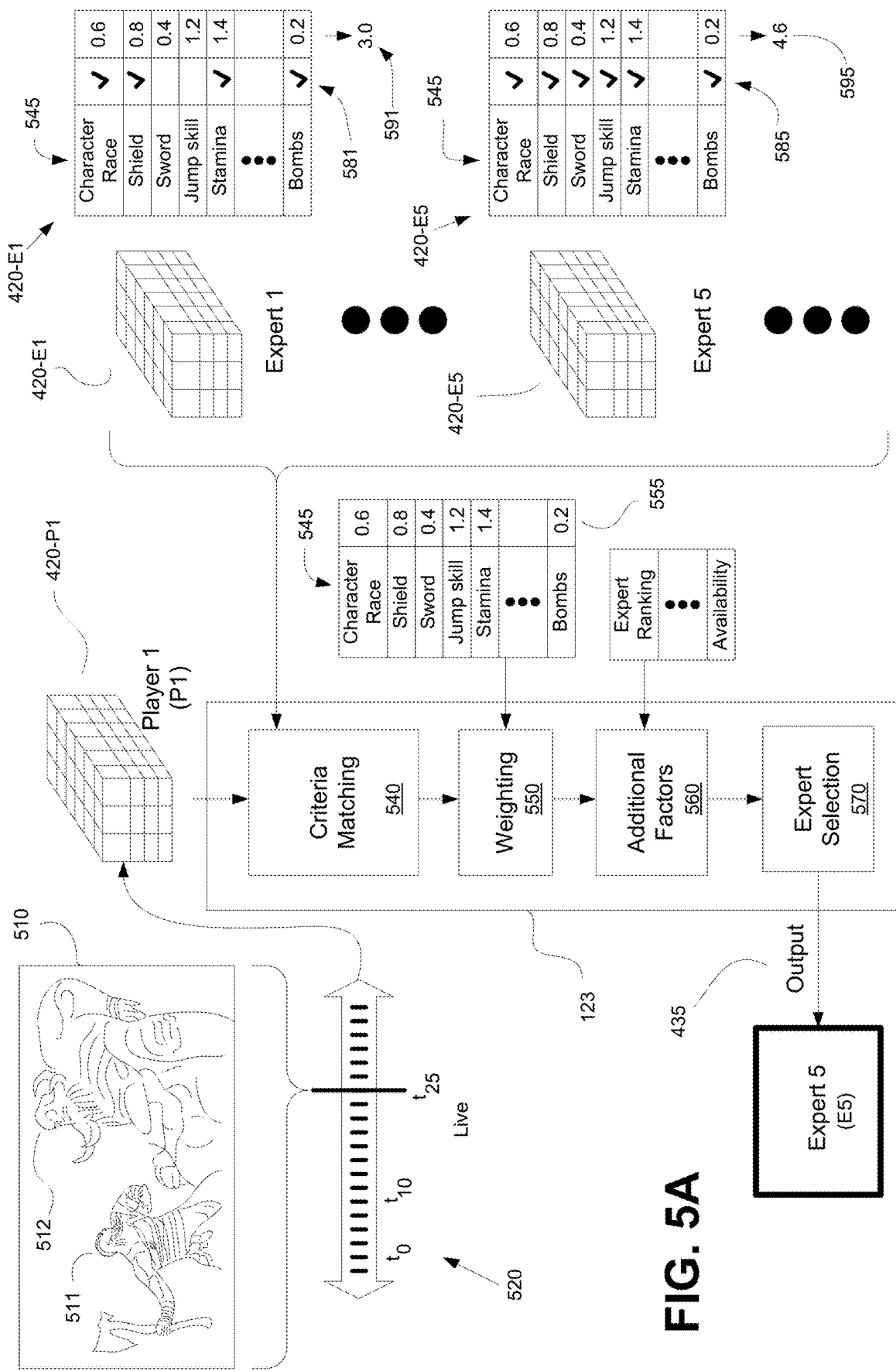
FIG. 5A is an illustration of the collection of game context of a player playing a gaming application, and the matching of the game context to game contexts of experts of the gaming application during the selection of an expert that provides real-time assistance to advance the game play of the player, the section made in response to a request by the player for assistance, in accordance with one embodiment of the present disclosure.

FIG. 5A is an illustration of the collection of game context of a player playing a gaming application, and the matching of the game context to game contexts of experts of the gaming application during the selection of an expert that provides real-time assistance to advance the game play of the player, the selection made in response to a request by the player for assistance, in accordance with one embodiment of the present disclosure. The matching process shown in FIG. 5A may be implemented by the matching engine 123. Further, FIG. 5A may be aligned with FIG. 4 to show that game contexts of the player P1 and a pool of experts 440 are compared by matching engine 123 to provide an output 435 indicating a selected expert E5.

In particular, FIG. 5A is relevant to a particular moment in time in the game play of player P1. For example, timeline 520 shows various points in the game play of player P1. These points may be assigned a time value in the timeline 520, such as time $t_0$ . . . time $t_{10}$ . . . to time $t_{25}$, which is the current time.

In one embodiment, the timeline may be used to provide replays of the game play of player P1 to the selected expert of the help session. For instance, a replay may rewind the game play for a pre-selected period of time (e.g., one time period, two time periods, etc.) as indicated by the timeline. Snapshots may be associated with each point in time of the timeline 520, wherein the snapshots are used to generate the replay. In another embodiment, the expert is able to select how much rewinding to perform. For example, the timeline 510 is sent to the a device of the expert, wherein the timeline comprises a plurality of snapshots generated during the game play of player P1. A selection of a snapshot is received from the device of the first expert (e.g., associated with a point in time). The game play is rewound to selected snapshot such that the game play begins from the selected snapshot on the device of the first expert. After the replay catches up to the current frame of the game play, the live game play may then be presented to the expert.

In addition, screen shot 510 shows a current video frame generated during the game play of player P1 at time $t_{25}$. Screen shot 510 shows the live game play of player P1. Purely for illustration purposes only, screen shot 510 may include a battle between Kratos 511 and the enemy combatant 512. In the God of War gaming application, Kratos is a Spartan warrior of Greek mythology, who is tasked with killing Ares, the God of War. In the game play, player P1 may control Kratos 511.

As previously described, matching engine 123 takes as input the game context 420-P1 of player P1 and game contexts of a pool of experts 440. For example, each of the game contexts are configured similarly for player P1 and the pool of experts 440, and include parameters 545 previously described, such as game state and user/player saved data. For example, parameters 545 may include game state data, such as: character, character race or type, current quest facing the character, next quest for the character, location of the game play in the gaming environment, level of the game play in the gaming application, assets of the character (e.g., shield type, sword type, bomb type, etc.), loadout, skill set of the character (jump skill, stamina, etc.), etc. Parameters 545 may include user save data (e.g., user profile data), such as: overall gaming skill of the player or corresponding expert, recency of playing the gaming application, willingness to seek help, etc.

The matching engine 123 is configured to generate matching vectors for each of the game contexts of the pool of experts 440, as previously described. For example, criteria matching 540 is performed by the matching engine 123 to generate the matching vectors. Each of the matching vectors has a matching value (e.g., quality factor or Q-factor) that indicates the quality of matching the corresponding expert game context to the game context of player P1. For example, FIG. 5A shows the comparison of the game context 420-E1 of expert E1 to the game context 420-P1 of player P1 in column 581. A check mark indicates a match for a corresponding parameter or criteria of the game context. The absence of a check mark indicates no match. In one implementation, the check mark is given a value of 1, but can be given any value. As shown, the game context 420-E1 matches at least the parameters for character race, shield, stamina, and bombs. This indicates that there is a strong likelihood that the game play of expert E1 has these defining parameters.

This comparison process can be repeated by the matching engine 123 for each game context associated with the pool of experts 440. For instance, FIG. 5A shows the comparison of the game context 420-E5 of expert E5 to the game context 420-P1 of player P1 in column 585. As shown, the game context 420-E5 closely matches the game context 420-P1, as all of the parameters have corresponding check marks.

In addition, matching engine 123 may apply a weighting application 550 is performed on the matching vectors. For example, column 555 shows weighting factors for each of the parameters 545 in the game contexts of the gaming application used by the matching engine 123. The weighting defines an importance of a corresponding parameter. In one implementation, the larger the weighting factor, the higher the performance. Of course, the reverse can be implemented throughout the selection process. As shown, character race has a weight of 0.6, shield a weight of 0.8, sword a weight of 0.4, jump skill a weight of 1.2, stamina a weight of 1.4 . . . bombs a weight of 0.2. That is, stamina and jump skill of the character is highly valued in the comparison. These factors may be important in accomplishing a particular task or quest.

Also, additional factors 560 may be considered by the matching engine 123. These factors may also be given a weight when comparing the game contexts. For instance, additional factors may include the rating of the expert, the ranking of the expert, whether the expert has reached a gold star status indicating the highest possible ranking, availability, etc.

The matching engine 123 performs an expert selection process 570. For example, the matching vectors are given a matching value after performing criteria matching 540, weighting 550, and the consideration of additional factor 560. For example, for expert E1 a matching value 591 (3.0) is generated. Also, for expert E5 a matching value 595 (4.6) is generated. Between the two experts, expert E5 has a higher matching value, which may indicate a better quality match, such that expert E5 may be better suited in providing assistance for the query of player P1 than expert E1.

Expert selection as performed by the expert selection process 570 may utilize any number of selection processes or criteria, as previously described. For illustration, if a highest quality match is used, then the highest value of the matching vector may indicate the highest quality match. In that case, the matching engine 123 would provide as output 435 the selection of expert E5, which is aligned with FIG. 4.

Figure 5B:
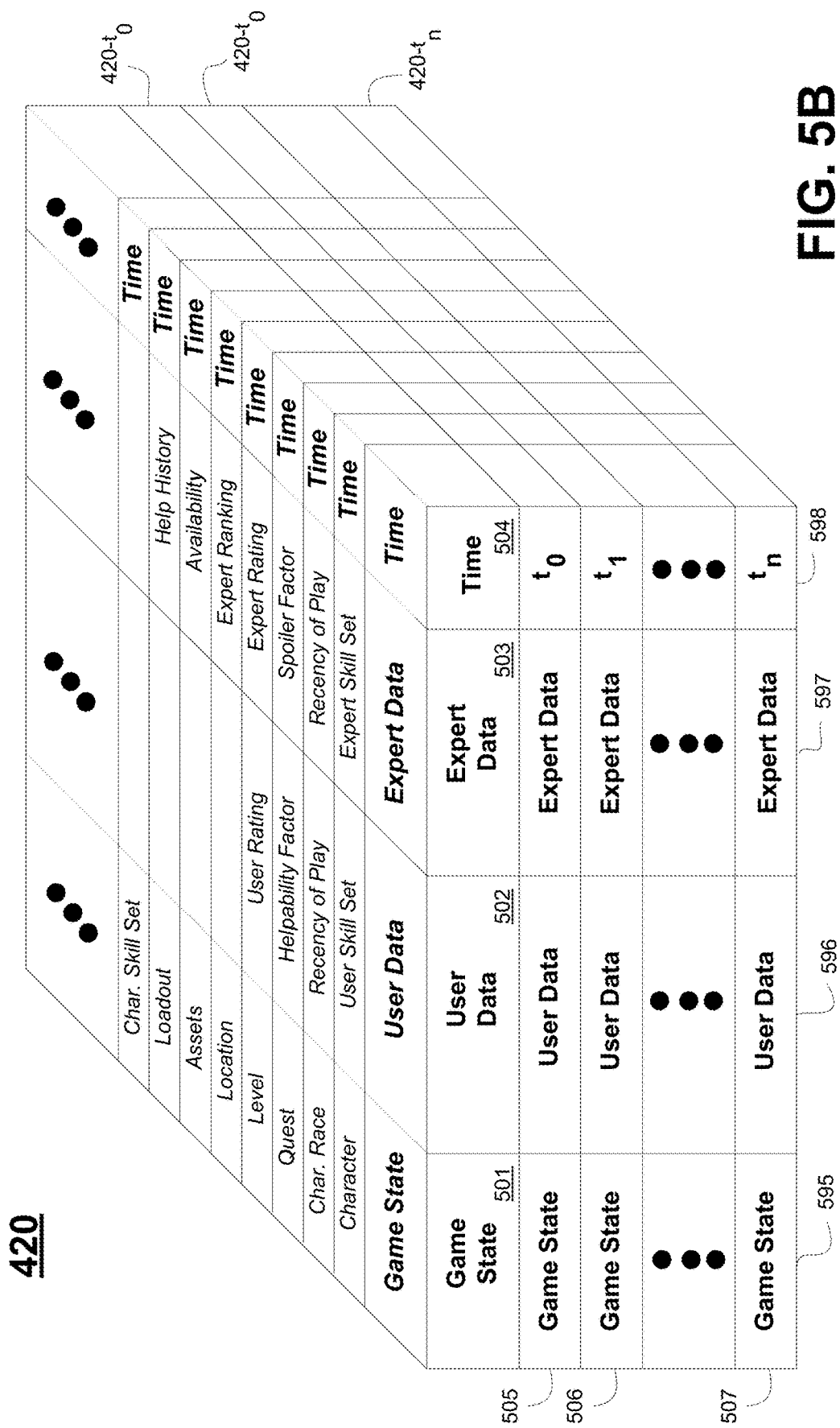
FIG. 5B is an illustration of the types of information collected for game context of a corresponding player playing a gaming application, in accordance with one embodiment of the present disclosure.

FIG. 5B is an illustration of the types of information collected for a game context 420 of a corresponding player or expert playing a gaming application, in accordance with one embodiment of the present disclosure. The game context 420 may be associated with a player or expert. For instance, following the example of FIG. 5A, respective game contexts for player P1 and experts in the pool of experts 440 may be similarly configured.

Purely for illustration, overall game context 420 may be captured at various points in the game play of a corresponding player or expert. That is, a plurality of game contexts may be captured, one for each defined time stamp. As shown, game context may be arranged as a block of data. Vertical slices are defined, and include vertical slice 595 for game state 501, vertical slice 596 for user data 502, vertical slice 597 for expert data 503, and vertical slice 598 for a time stamp 504.

In addition, each horizontal slice defines a particular game context for a corresponding time stamp. For example, at time $t_0$, the horizontal slice 505 defines the game context 420-$t_0$, at time $t_1$, the horizontal slice 506 defines the game context 420-$t_1$ . . . at time $t_n$, the horizontal slice 507 defines the game context 420-$t_n$. That is, for each horizontal slice (corresponding to a particular game context) information is provided for each parameter in respective slices. For example, for time $t_0$ and the corresponding game context 420-$t_0$, for vertical slice 595 corresponding to game state 501, the corresponding intersection of the horizontal slice 505 includes information for one or more parameters, such as: character, character race, quest, level, location, loadout, character skill set, etc. In addition, for time $t_0$ and the corresponding game context 420-$t_0$, for vertical slice 596 corresponding to user data 502, the corresponding intersection of the horizontal slice 505 includes information for one or more parameters, such as: user skill set, recency of play, helpability factor (willingness to accept help), user rating or ranking, etc. Also, for time $t_0$ and the corresponding game context 420-$t_0$, for vertical slice 596 corresponding to expert data 503, the corresponding intersection of the horizontal slice 505 includes information for one or more parameters, such as: expert skill set, recency of play, spoiler factor indicating how loose the expert is with spoilers, expert rating, expert ranking, availability, help history, etc. The information for categories in game context 420 including game state 501, user data 502, and expert data 503 are provided merely for illustration purposes, and may be moved between each of the defined categories for game context, or shared between categories, or include different information in each category.

Figure 6A:
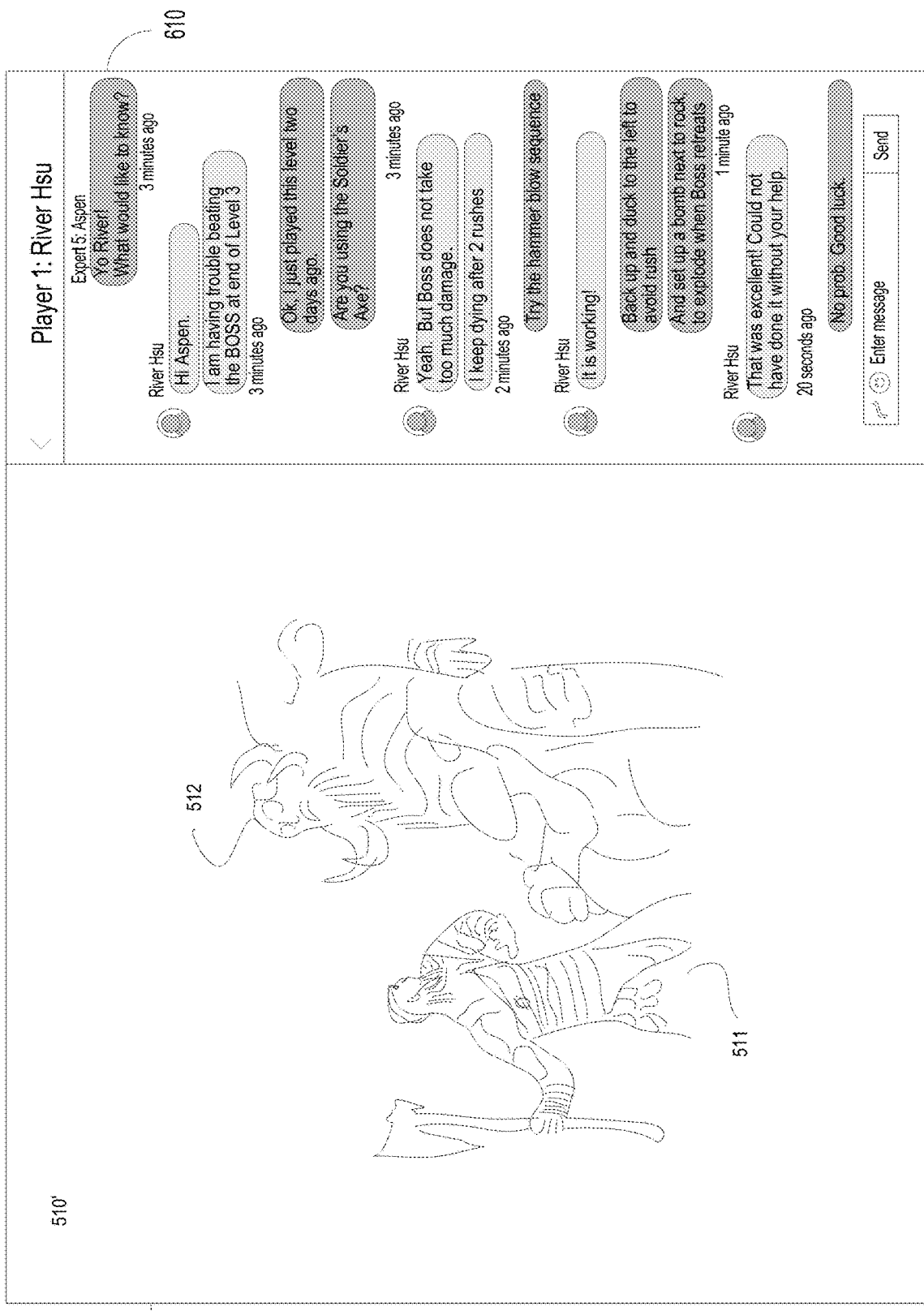
FIG. 6A is an illustration of a user interface providing real-time assistance during game play of a player playing a gaming application by connecting the player to an expert over a communication session, wherein the user interface includes a window displaying a two-way textual conversation between the player and the expert, in accordance with one embodiment of the present disclosure.

FIG. 6A is an illustration of a user interface 110-P1 for user P1, wherein the user interface provides real-time assistance during the game play of player P1, in accordance with one embodiment of the present disclosure. Player P1 may be playing a gaming application. The assistance is provided through a help session, wherein the help session is implemented by connecting the player P1 to an expert over a communication session.

In FIG. 6A, the help session may be delivered along with the data representative of game play of the player P1, such as through a split screen including a first screen showing the game play and a second screen showing the help session. As shown, user interface 110-P1 shows a screen shot 510' of the current game play in the first screen or window. For example, the screen shot may show an interaction between Kratos 511 and an enemy combatant 512 in the gaming application—God of War, as previously introduced.

In addition, the user interface 110-P1 shows the second screen or window 610 showing the help session. Window 610 displays a two-way textual conversation between the player P1 and the expert. For illustration, player P1 may be named River Hsu and the expert may be named Aspen. The help session of FIG. 6A is generated in real-time, and as such delivered concurrent with the game play of the player P1, such that the information provided through the help session supports the game play of the player P1. In particular, window 610 shows the textual entries made during the running conversation between player P1 (River) and the expert—Aspen. In the conversation of the help session, the expert is quickly determining the problem that player P1 is faced with, and is providing assistance in solving that problem. For example, the problem may be that player P1 is unable to beat the Boss at the end of Level 3. The expert (Aspen) is providing instructions to player P1 (River) during the game play that is controlled by player P1. These instructions were helpful, as player P1 beats the Boss and thanks the expert at the end of the dialogue.

Figure 6B:
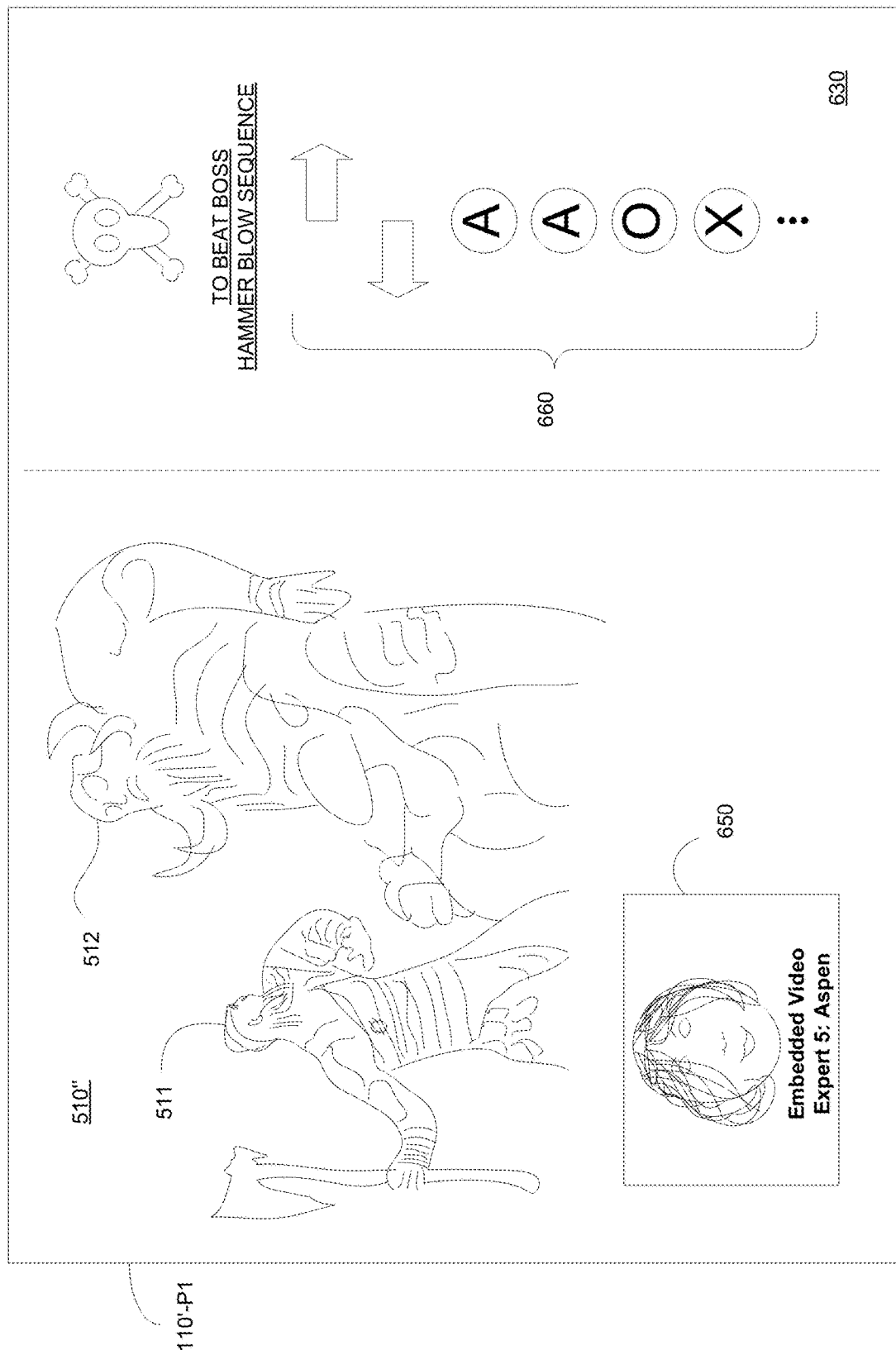
FIG. 6B is an illustration of a user interface providing real-time assistance during game play of a player playing a gaming application by connecting the player to an expert over a communication session, such as a voice communication session, wherein the user interface may include a window displaying real-time video of the expert in synchronization with the voice communication session, and wherein the expert has taken over control of the game play of the player, in accordance with one embodiment of the present disclosure.

FIG. 6B is an illustration of a user interface providing real-time assistance during game play of a player (e.g., player P1) playing a gaming application by connecting the player to an expert over a communication session, in accordance with one embodiment of the present disclosure. The assistance is provided through a help session, wherein the help session is implemented by connecting the player P1 to an expert E5 (Aspen) over a communication session. FIG. 6B is aligned with FIG. 6A, wherein expert E5 and player P1 are participating in the help session.

In FIG. 6B, the help session may be delivered along with the data representative of game play of the player P1, such as through a split screen including a first screen showing the game play and a second screen showing the help session. As shown, user interface 110'-P1 shows a screen shot 510" of the current game play in the first screen or window. For example, the screen shot may show an interaction between Kratos 511 and an enemy combatant 512 in the gaming application—God of War, as previously introduced.

In addition, the user interface 110'-P1 shows the second screen or window 630 showing the help session. In the help session, the expert and the player P1 may have agreed to a share play functionality, wherein the control of the game play of player P1 may be taken over by the expert, as previously described. In one implementation, user interface 110'-P1 may include a window 650 displaying real-time video of the expert in synchronization with a voice communication session in the help session. The expert may be providing instructions or assistance through the embedded video that is synchronized with audio between the expert and the player P1. Further, in the share play functionality, the expert has taken over control of the game play of the player. For example, the expert may have taken control so that the character Kratos 511 will beat the enemy combatant 512 in a battle, which previously the player P1 could not accomplish. The game play as controlled by the expert is shown in screen or window 510".

Additionally, window 630 may provide information related to the assistance provided by the expert. For example, the sequence of control inputs (e.g., input commands) made by the expert when battling the enemy combatant 512 may be provided. Purely for illustration, the expert may have told the player P1 that the key to beating the enemy combatant 512 (as the Boss) is performing the "hammer blow sequence." The player P1 may not know that sequence, or may not be proficient in performing that sequence, and has authorized the expert to take over control the game play in order to beat the enemy combatant 512. As the expert is submitting input commands for controlling the game play, the associated controller inputs or actions are displayed in window 630. For example, a sequence of controller inputs 660 may include right button, left button, A button, A button, O button, X button, etc.

Figure 8:
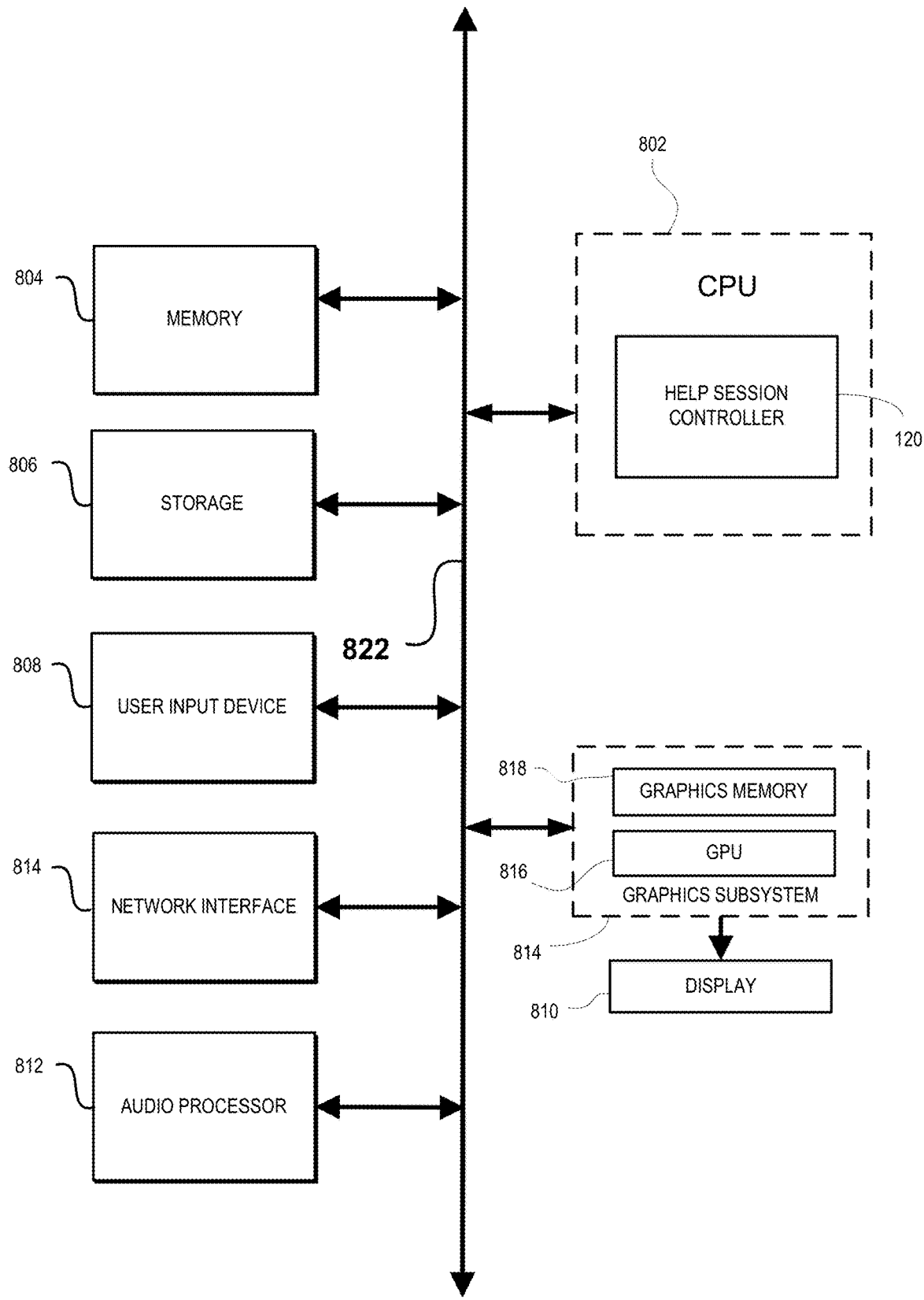
FIG. 8 illustrates components of an example device that can be used to perform aspects of the various embodiments of the present disclosure.

FIG. 8 illustrates components of an example device 800 that can be used to perform aspects of the various embodiments of the present disclosure. For example, FIG. 8 illustrates an exemplary hardware system suitable for implementing a device that provides services in support of a user, such as providing real-time assistance to a player playing a gaming application by connecting that player to an expert in a help session, in accordance with one embodiment. This block diagram illustrates a device 800 that can incorporate or can be a personal computer, video game console, personal digital assistant, or other digital device, suitable for practicing an embodiment of the disclosure. Device 800 includes a central processing unit (CPU) 802 for running software applications and optionally an operating system. CPU 802 may be comprised of one or more homogeneous or heterogeneous processing cores. For example, CPU 802 is one or more general-purpose microprocessors having one or more processing cores. Further embodiments can be implemented using one or more CPUs with microprocessor architectures specifically adapted for highly parallel and computationally intensive applications, such as media and interactive entertainment applications, or applications configured for providing real-time assistance either through a live help session or through recorded help sessions as implemented through at least the help session controller 120, as previously described. Device 800 may be a localized to a player requesting assistance (e.g., game console), or remote from the player (e.g., back-end server processor).

Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include keyboards, mice, joysticks, touch pads, touch screens, still or video recorders/cameras, tracking devices for recognizing gestures, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, memory 804, data storage 806, user input devices 808, network interface 810, and audio processor 812 are connected via one or more data buses 822

A graphics subsystem 814 is further connected with data bus 822 and the components of the device 800. The graphics subsystem 814 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 816, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 810, or to be projected by projection system 840. Display device 810 can be any device capable of displaying visual information in response to a signal from the device 800, including CRT, LCD, plasma, and OLED displays. Device 800 can provide the display device 810 with an analog or digital signal, for example.

While specific embodiments have been provided to demonstrate the providing of real-time assistance during game play of a player playing a gaming application through live help sessions (e.g., connecting player to an expert through a communication session), or through recorded help sessions (e.g., connecting player to a recorded help session transmitted over a communication session), these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

Figure 9:
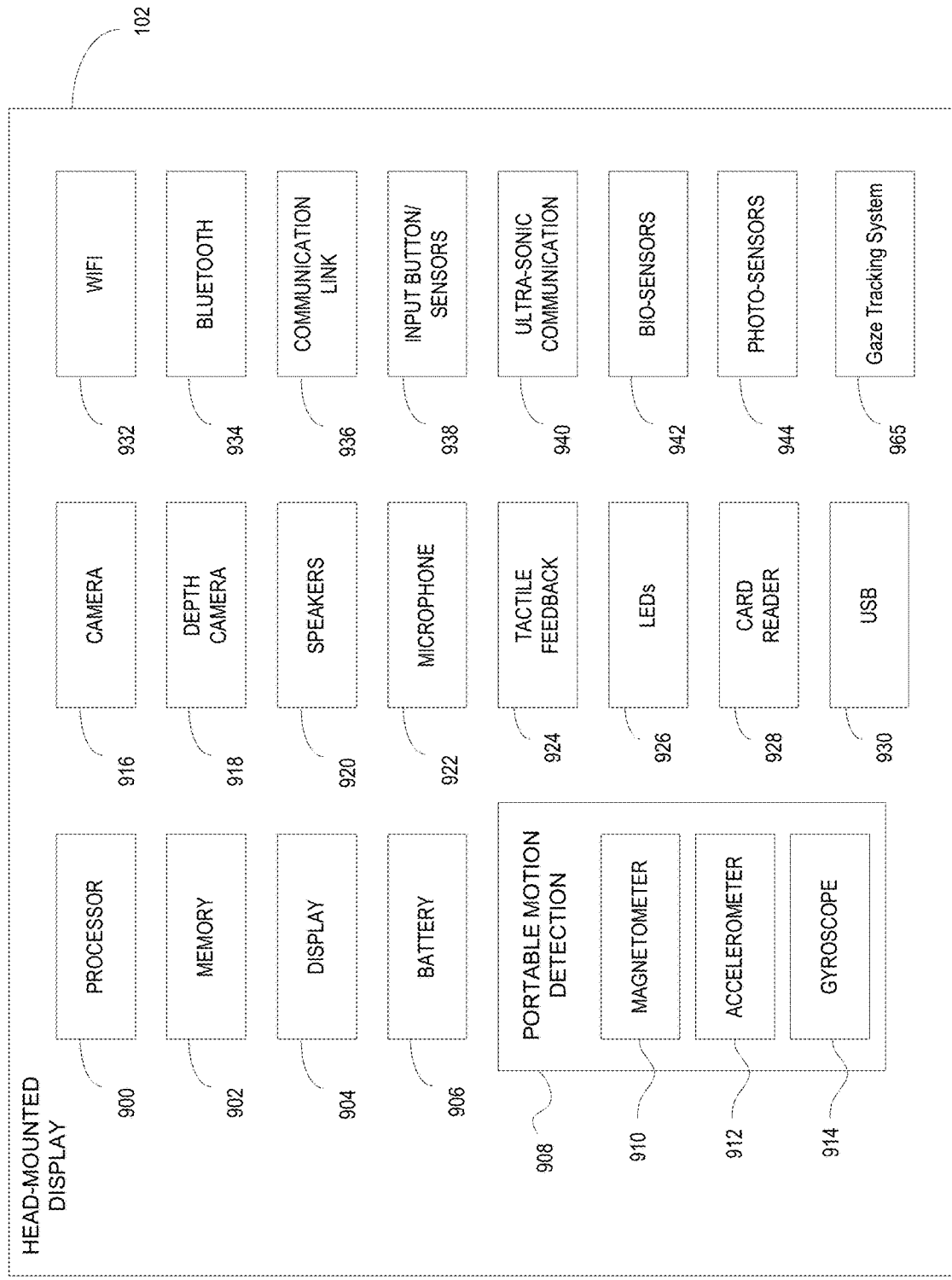
FIG. 9 is a diagram illustrating components of a head-mounted display is shown, in accordance with an embodiment of the disclosure.

It should be understood that the embodiments described herein may be executed on any type of client device. In some embodiments, the client device is a head mounted display (HMD), or projection system. FIG. 9, a diagram illustrating components of a head-mounted display 102 is shown, in accordance with an embodiment of the disclosure. The HMD 102 may be configured to receive real-time assistance providing during game play of a player playing a gaming application either through a live help session or through a recorded help session.

The head-mounted display 102 includes a processor 900 for executing program instructions. A memory 902 is provided for storage purposes, and may include both volatile and non-volatile memory. A display 904 is included which provides a visual interface that a user may view. A battery 906 is provided as a power source for the head-mounted display 102. A motion detection module 908 may include any of various kinds of motion sensitive hardware, such as a magnetometer 910A, an accelerometer 912, and a gyroscope 914.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 912 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 910A are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 912 is used together with magnetometer 910A to obtain the inclination and azimuth of the head-mounted display 102.

A gyroscope is a device for measuring or maintaining orientation, based on the principles of angular momentum. In one embodiment, three gyroscopes 914 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 916 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 918 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 920 for providing audio output. Also, a microphone 922 may be included for capturing audio from the real environment, including sounds from the ambient environment, speech made by the user, etc. The head-mounted display 102 includes tactile feedback module 924 for providing tactile feedback to the user. In one embodiment, the tactile feedback module 924 is capable of causing movement and/or vibration of the head-mounted display 102 so as to provide tactile feedback to the user.

LEDs 926 are provided as visual indicators of statuses of the head-mounted display 102. For example, an LED may indicate battery level, power on, etc. A card reader 928 is provided to enable the head-mounted display 102 to read and write information to and from a memory card. A USB interface 930 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 932 is included for enabling connection to the Internet via wireless networking technologies. Also, the head-mounted display 102 includes a Bluetooth module 934 for enabling wireless connection to other devices. A communications link 936 may also be included for connection to other devices. In one embodiment, the communications link 936 utilizes infrared transmission for wireless communication. In other embodiments, the communications link 936 may utilize any of various wireless or wired transmission protocols for communication with other devices.

Input buttons/sensors 938 are included to provide an input interface for the user. Any of various kinds of input interfaces may be included, such as buttons, touchpad, joystick, trackball, etc. An ultra-sonic communication module 940 may be included in head-mounted display 102 for facilitating communication with other devices via ultra-sonic technologies.

Bio-sensors 942 are included to enable detection of physiological data from a user. In one embodiment, the bio-sensors 942 include one or more dry electrodes for detecting bio-electric signals of the user through the user's skin.

Photo-sensors 944 are included to respond to signals from emitters (e.g., infrared base stations) placed in a 3-dimensional physical environment. The gaming console analyzes the information from the photo-sensors 944 and emitters to determine position and orientation information related to the head-mounted display 102.

In addition, gaze tracking system 965 is included and configured to enable tracking of the gaze of the user. For example, system 965 may include gaze tracking cameras which captures images of the user's eyes, which are then analyzed to determine the gaze direction of the user. In one embodiment, information about the gaze direction of the user can be utilized to affect the video rendering. Video rendering in the direction of gaze can be prioritized or emphasized, such as by providing greater detail, higher resolution through foveated rendering, higher resolution of a particle system effect displayed in the foveal region, lower resolution of a particle system effect displayed outside the foveal region, or faster updates in the region where the user is looking.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned head mounted device may be utilized in conjunction with an interactive application displayed on a display to provide various interactive functions. The exemplary embodiments described herein are provided by way of example only, and not by way of limitation.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
receiving over a network at a back-end server information related to a plurality of game plays of a plurality of players playing a gaming application;
determining from the information a current game context of a game play of a player playing the gaming application, wherein the current game context is defined by a set of parameters;
determining from the information a plurality of expert game contexts of a plurality of expert game plays of a plurality of experts that have played the gaming application, the plurality of expert game plays generated from players classified as experts for the gaming application, the plurality of expert game contexts being associated with a plurality of matching values that is based on the set of parameters, each matching value relating a corresponding expert game context to the current game context of the game play of the player, the set of parameters including a weighting greater than zero for each parameter, wherein the set of parameters includes at least two parameters, wherein each weighting defines importance of a corresponding parameter in relation to other parameters in the set of parameters;
receiving an assistance query related to the game play;
comparing the current game context of the player to the plurality of expert game contexts;
assigning to the player an expert for obtaining assistance, the expert having an expert game context for an expert game play that matches the current game context of the player based on the set of parameters and associated weighting producing a matching value that exceeds a threshold; and
generating a communication session between a device of the expert and a device of the player to enable the expert to render the assistance to the player.

2. The method of claim 1, wherein the comparing includes:
wherein each matching vector in a plurality of matching vectors includes a corresponding matching value indicating a quality of matching the corresponding expert game context to the current game context; and
determining a set of matched expert game contexts having matching values that exceed the threshold,
wherein the expert game context of the expert is included within the set of matched expert game contexts.

3. The method of claim 2, wherein the assigning includes:
determining a highest value in the set of matched expert game contexts, the highest value corresponding to the expert game context of the expert.

4. The method of claim 1, wherein the assigning includes:
broadcasting a notification requesting assistance generated in response to the assistance query to one or more devices of at least one expert associated with expert game contexts having matching values that exceed the threshold; and
in a race of responses, determining that a response to the notification received from the expert has a shortest response time.

5. The method of claim 1, wherein the communication session comprises at least one of:
a voice channel; or
a text channel; or
a video chat channel.

6. The method of claim 1, further comprising:
receiving authorization to share video of the game play from the device of the player; and
streaming the video of the game play to the device of the expert over the communication session.

7. The method of claim 6, further comprising:
reformatting the video of the game play to be compatible with the device of the expert.

8. The method of claim 1, further comprising:
receiving authorization to share control of the game play from the device of the player;
delivering a set of input controls from the device of the expert to a processor executing the gaming application for the game play of the player; and
blocking input controls from the device of the player.

9. The method of claim 1, further comprising:
receiving authorization to receive a current game play of the expert from the device of the player; and
streaming over the communication session the current game play of the expert from a processor executing the gaming application that is limited to the current game context of the player.

10. The method of claim 1, wherein the set of parameters includes:
a character;
character race or type;
current quest facing the character;
next quest for the character;
location of the game play in a gaming environment;
level of the game play in the gaming environment;
assets;
loadout;
skill set of the character;
overall gaming skill of the corresponding player or corresponding expert;
recency of playing the gaming application; and
willingness to seek help.

11. The method of claim 1, wherein the communication session is a peer-to-peer connection.

12. The method of claim 1, wherein the communication session includes the back-end server as an intermediary node.

13. A non-transitory computer-readable medium storing a computer program for performing a method, the computer-readable medium comprising:
program instructions for receiving over a network at a back-end server information related to a plurality of game plays of a plurality of players playing a gaming application;
program instructions for determining from the information a current game context of a game play of a player playing the gaming application, wherein the current game context is defined by a set of parameters;
program instructions for determining from the information a plurality of expert game contexts of a plurality of expert game plays of a plurality of experts that have played the gaming application, the plurality of expert game plays generated from players classified as experts for the gaming application, the plurality of expert game contexts being associated with a plurality of matching values that is based on the set of parameters, each matching value relating a corresponding expert game context to the current game context of the game play of the player, the set of parameters including a weighting greater than zero for each parameter, wherein the set of parameters includes at least two parameters, wherein each weighting defines importance of a corresponding parameter in relation to other parameters in the set of parameters;
program instructions for receiving an assistance query related to the game play;
program instructions for comparing the current game context of the player to the plurality of expert game contexts;
program instructions for assigning to the player an expert for obtaining assistance, the expert having an expert game context for an expert game play that matches the current game context of the player based on the set of parameters and associated weighting for the expert game context producing a matching value that exceeds a threshold; and
program instructions for generating a communication session between a device of the expert and a device of the player to enable the expert to render the assistance to the player.

14. The computer-readable medium of claim 13, wherein the program instructions for comparing includes:
wherein each matching vector in a plurality of matching vectors includes a corresponding matching value indicating a quality of matching the corresponding expert game context to the current game context; and
program instructions for determining a set of matched expert game contexts having matching values that exceed the threshold,
wherein the expert game context of the expert is included within the set of matched expert game contexts.

15. The computer-readable medium of claim 14, wherein the program instructions for assigning includes:
program instructions for determining a highest value in the set of matched expert game contexts, the highest value corresponding to the expert game context of the expert.

16. The computer-readable medium of claim 13, further comprising:
program instructions for receiving authorization to share video of the game play from the device of the player; and
program instructions for streaming the video of the game play to the device of the expert over the communication session.

17. The computer-readable medium of claim 13, further comprising:
program instructions for receiving authorization to share control of the game play from the device of the player;
program instructions for delivering a set of input controls from the device of the expert to a processor executing the gaming application for the game play of the player; and
blocking input controls from the device of the player.

18. The computer-readable medium of claim 13, further comprising:
program instructions for receiving authorization to receive current game play of the expert from the device of the player; and
program instructions for streaming over the communication session the current game play of the expert from a processor executing the gaming application that is limited to the current game context of the player.

19. The computer-readable medium of claim 13, wherein the communication session is a peer-to-peer connection.

20. A method, comprising:
receiving at a server information related to a plurality of game plays of a plurality of players playing a gaming application;
determining from the information a current game context of a game play of a player, wherein the current game context is defined by a set of parameters;
determining from the information a plurality of expert game contexts from one or more players classified as experts, the plurality of expert game contexts being associated with a plurality of matching values that is based on the set of parameters, each matching vector of a plurality of matching vectors is associated with a corresponding matching value relating a corresponding expert game context to the current game context of the game play of the player, the set of parameters including a weighting greater than zero for each parameter, wherein the set of parameters includes at least two parameters, wherein each weighting defines importance of a corresponding parameter in relation to other parameters in the set of parameters;
receiving an assistance query related to the game play;
comparing the current game context to the plurality of expert game contexts;
assigning to the player an expert for assistance, the expert having an expert game context that matches the current game context of the player based on the set of parameters and associated weighting producing a matching value that exceeds a threshold; and generating a communication session between a device of the expert and a device of the player to enable the expert to render the assistance to the player.

21. The method of claim 20, wherein the comparing includes:

wherein each matching vector in the plurality of matching vectors having the corresponding matching value indicates a quality of matching the corresponding expert game context to the current game context; and determining a set of matched expert game contexts having matching values that exceed the threshold, wherein the expert game context of the expert is included within the set of matched expert game contexts.

22. The method of claim 21, wherein the assigning includes:

determining a highest value in the set of matched expert game contexts, the highest value corresponding to the expert game context of the expert.

23. The method of claim 20, wherein the assigning includes:

broadcasting a notification requesting assistance generated in response to the assistance query to one or more devices of at least one expert associated with expert ame contexts having a matching values that exceeded the threshold expert; and in a race of responses, determining that a response to the notification received from the expert has a shortest response time.

24. The method of claim 20, further comprising:

receiving authorization to share video of game play of the player from the device of the player; and streaming the video of the game play of the player to the device of the expert over the communication session.

25. The method of claim 20, further comprising:

receiving authorization to share control of game play of the player from the device of the player; and delivering a set of input controls from the device of the expert to a processor executing the gaming application for the game play of the player; and blocking input controls from the device of the player.

26. The method of claim 20, further comprising:

receiving authorization to receive a current game play of the expert from the device of the player; and streaming over the communication session the current game play of the expert from a processor executing the gaming application that is limited to the current game context of the player.

* * * * *